United States Patent [19]
Chattey

[11] Patent Number: 5,823,714
[45] Date of Patent: Oct. 20, 1998

[54] UNIVERSAL, ENVIRONMENTALLY SAFE, MODULAR CAISSON SYSTEMS AND CAISSON MUDULES FOR USE THEREWITH

[76] Inventor: Nigel Chattey, 150 Cedarlawn Rd., Irvington-on-Hudson, N.Y. 10533

[21] Appl. No.: 65,819

[22] Filed: May 21, 1993

Related U.S. Application Data

[63] Continuation of Ser. No. 766,632, Sep. 26, 1991, which is a continuation of Ser. No. 578,761, Sep. 6, 1990, Pat. No. 5,061,122.

[51] Int. Cl.$^6$ ...................................................... E02B 17/02
[52] U.S. Cl. ........................ 405/204; 405/8; 405/195.1; 405/217
[58] Field of Search ............................ 405/30–35, 195.1, 405/203, 204, 217, 15–21; 52/284; 256/19

[56] References Cited

U.S. PATENT DOCUMENTS

| | | | |
|---|---|---|---|
| 231,957 | 9/1880 | Dyer | 405/33 X |
| 414,244 | 11/1889 | Patton | 405/8 |
| 559,116 | 4/1896 | Baldwin | 405/204 X |
| 609,686 | 8/1898 | Lovejoy | 405/10 |
| 868,092 | 10/1907 | Hennebique | 405/205 |
| 924,362 | 6/1909 | Leow | 405/13 |
| 1,151,974 | 8/1915 | Straight | 256/19 |
| 1,610,341 | 12/1926 | Wells | 405/21 |
| 2,474,786 | 6/1949 | Humphrey | 405/30 |
| 2,705,403 | 4/1955 | Ebert | 405/13 |
| 2,939,290 | 6/1960 | Crake | 405/205 |
| 3,118,282 | 1/1964 | Jarlan | 405/31 |
| 3,498,065 | 3/1970 | Templeton | 405/204 |
| 3,710,579 | 1/1973 | Killmer et al. | 405/11 |
| 4,118,941 | 10/1978 | Bruce et al. | 405/207 X |
| 4,175,888 | 11/1979 | Ijima | 405/31 |
| 4,279,536 | 7/1981 | Jarlan | 405/31 |
| 4,326,822 | 4/1982 | Oshima et al. | 405/217 |
| 4,504,172 | 3/1985 | Clinton et al. | 405/217 |
| 4,512,684 | 4/1985 | Hale et al. | 405/217 |
| 4,523,879 | 6/1985 | Finucane et al. | 405/217 |
| 4,583,882 | 4/1986 | Szabo | 405/217 |

FOREIGN PATENT DOCUMENTS

| | | |
|---|---|---|
| 0244930 | 11/1987 | European Pat. Off. . |
| 0511443 | 12/1920 | France ..................................... 405/10 |
| 0743246 | 3/1933 | France . |
| 1012795 | 7/1952 | France . |
| 2616464 | 12/1988 | France . |
| 0000079 | of 1867 | United Kingdom ..................... 405/34 |

OTHER PUBLICATIONS

Agema, "Havendammen aan zee" Cement, vol. 24, No. 12, Dec. 1972 Amsterdam, pp. 511–515.

Mouw, "Geotextielen bij het Oosterschelde–project: Ontwikkeling en toepassing", Pt/Civiele Techniek, vol. 41, No. 1, Mar. 1986, Den Haag, pp. 5–12.

Primary Examiner—Dennis L. Taylor
Attorney, Agent, or Firm—Adams & Wilks

[57] ABSTRACT

A modular caisson installation demountably installed at a preselected water site. The modular caisson installation includes a plurality of caissons having tops and bottoms and being individually demountably installed in a predetermined configuration at a preselected water site with the caisson bottoms removably seated on a bed at the preselected water site. The caissons being constructed of one or more floatable sections each being fluid trimmable and fluid ballastable and having means for trimming and ballasting the section with fluid to effect controlled lowering and positioning thereof during formation of the installation and controlled raising and removal thereof by floatation to enable demounting of the installation.

63 Claims, 16 Drawing Sheets

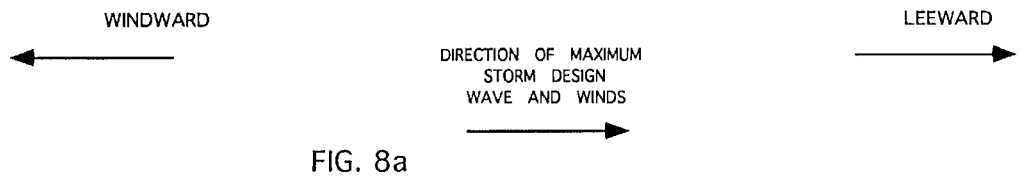
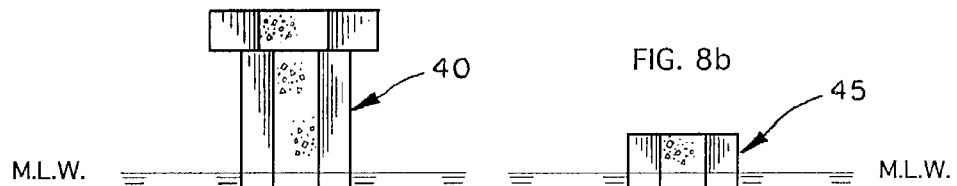
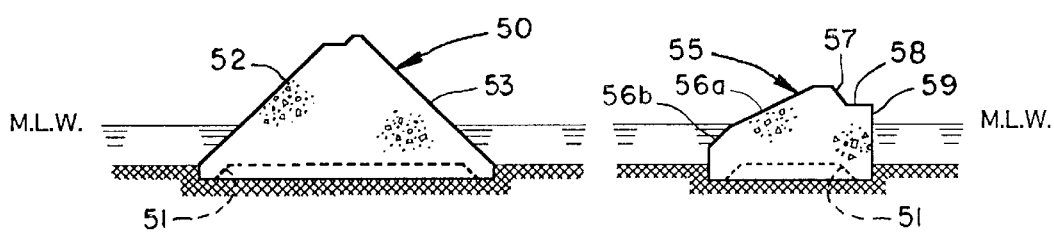
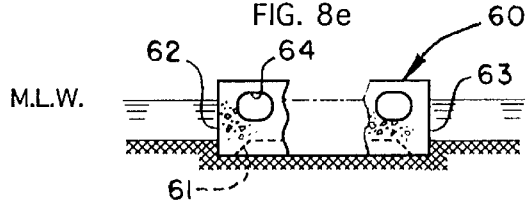
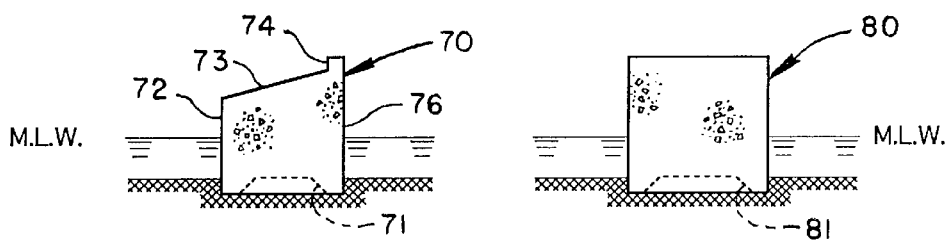

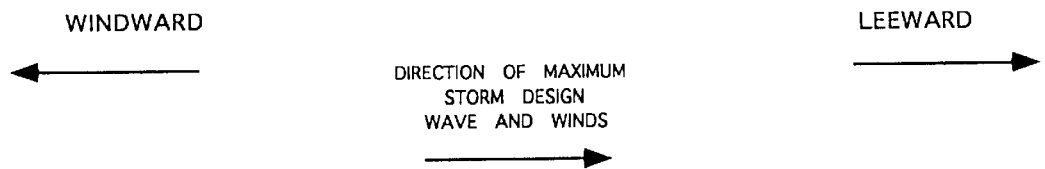
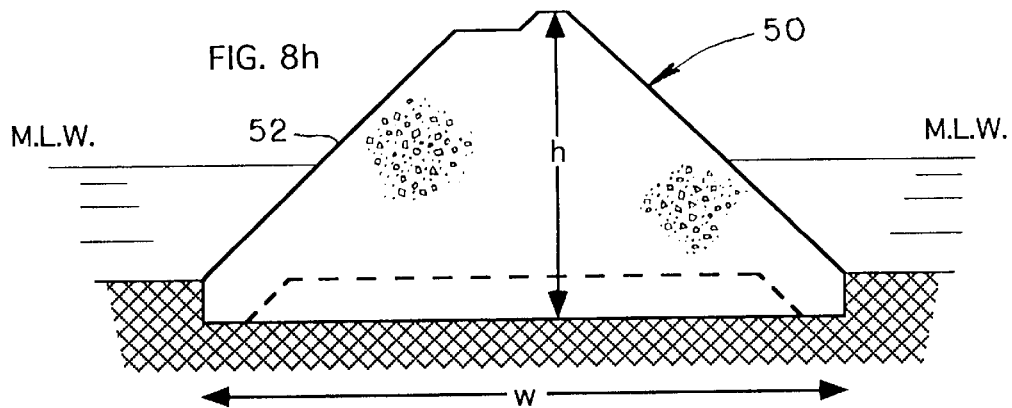
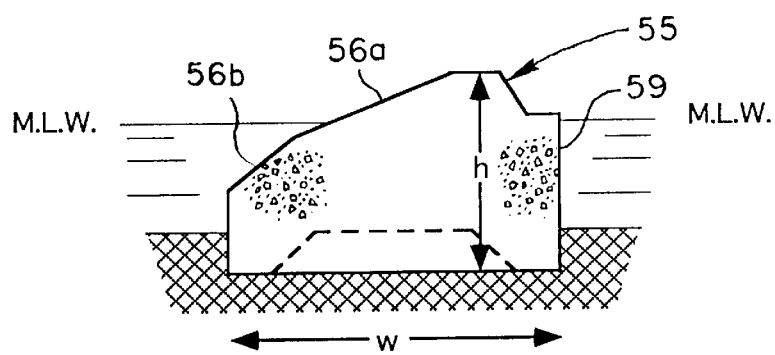
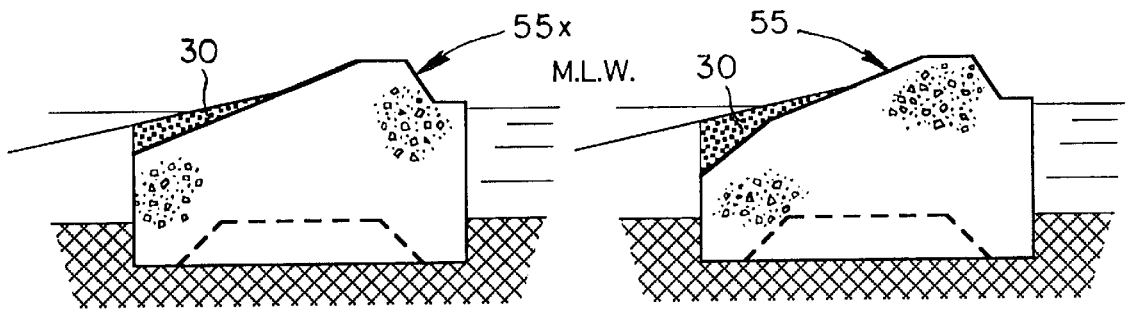

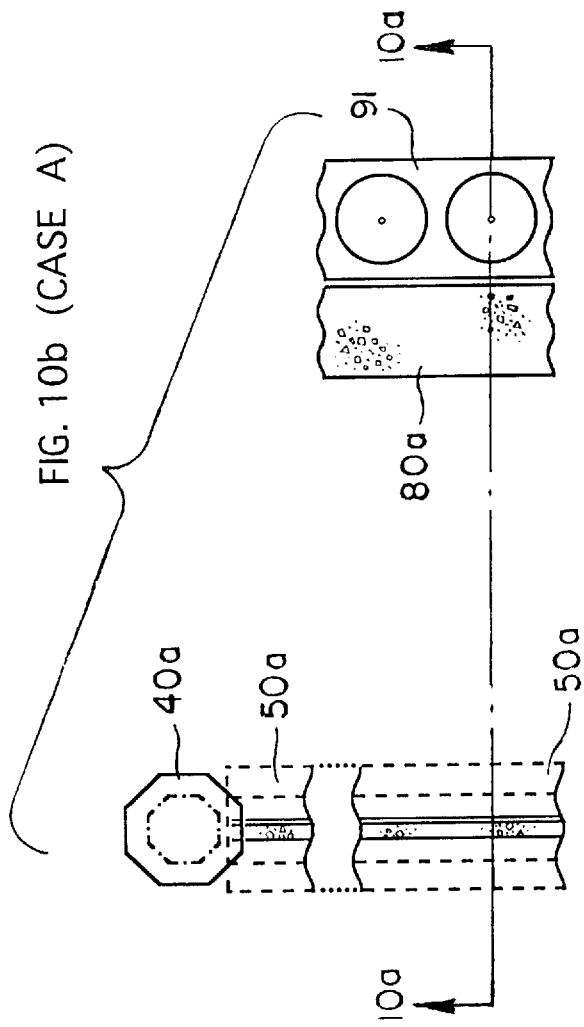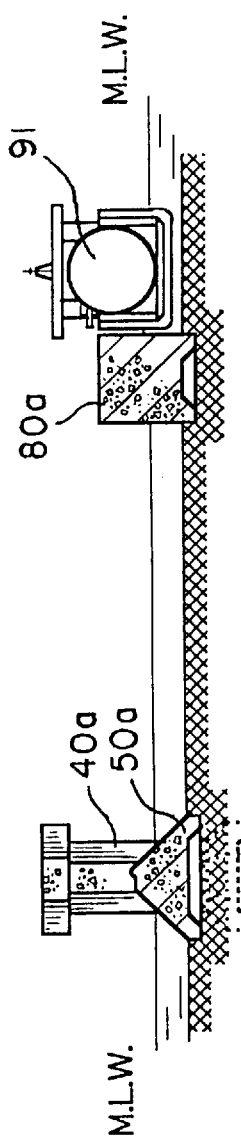

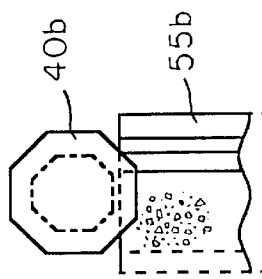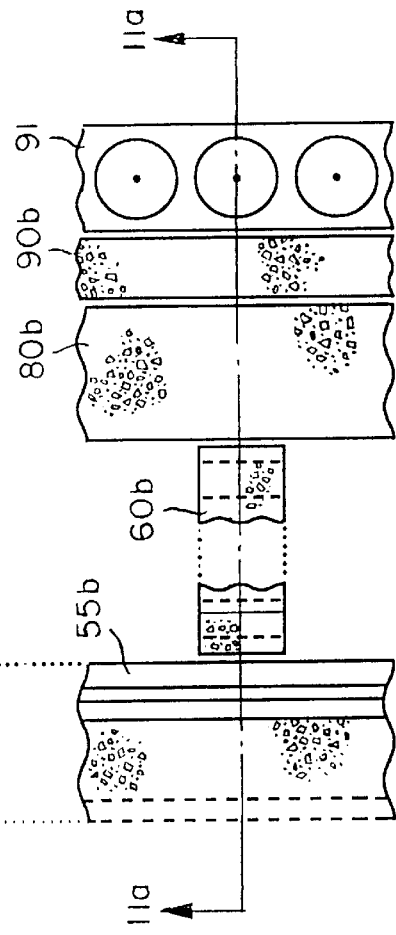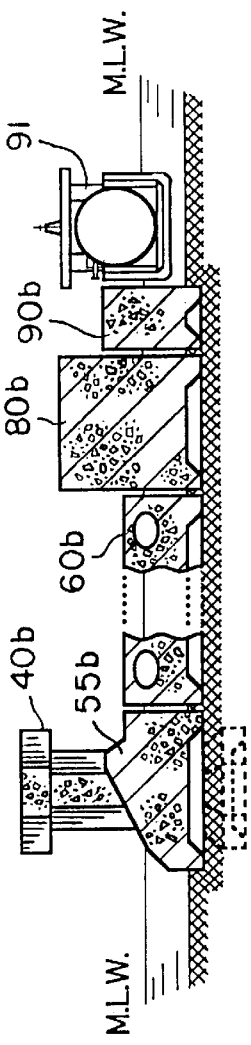

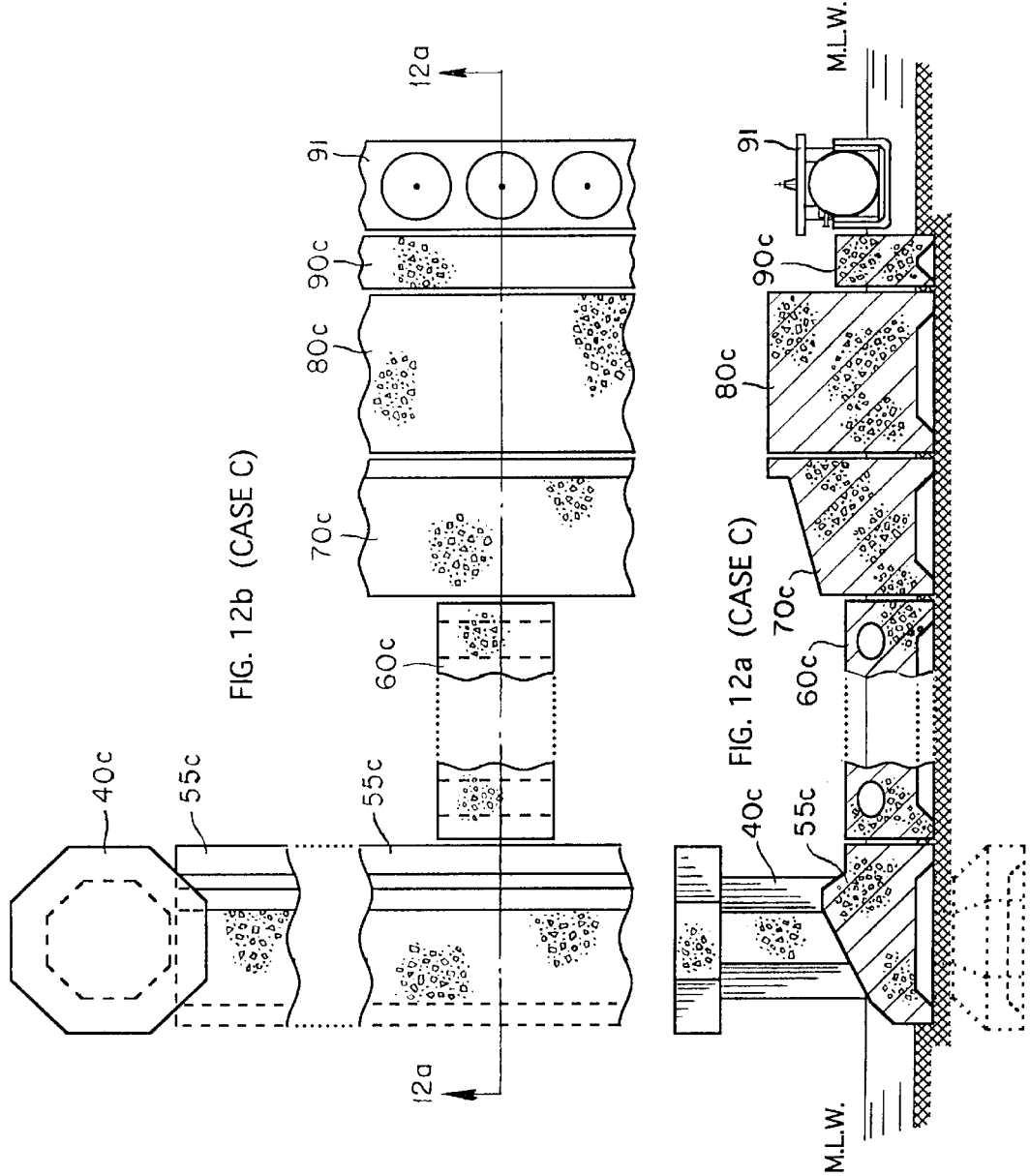

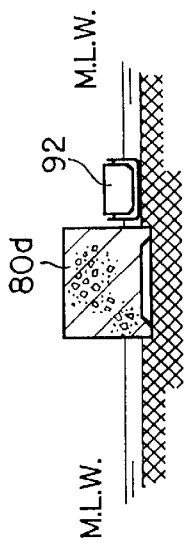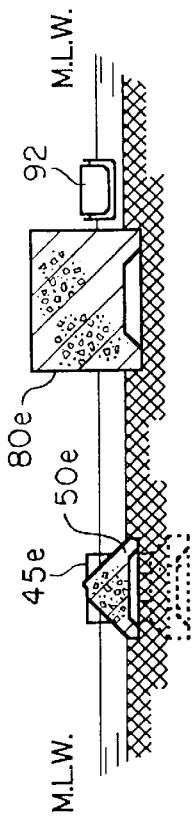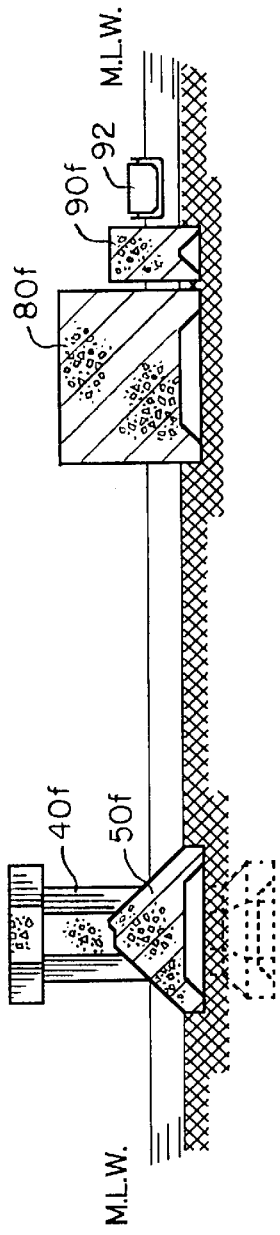

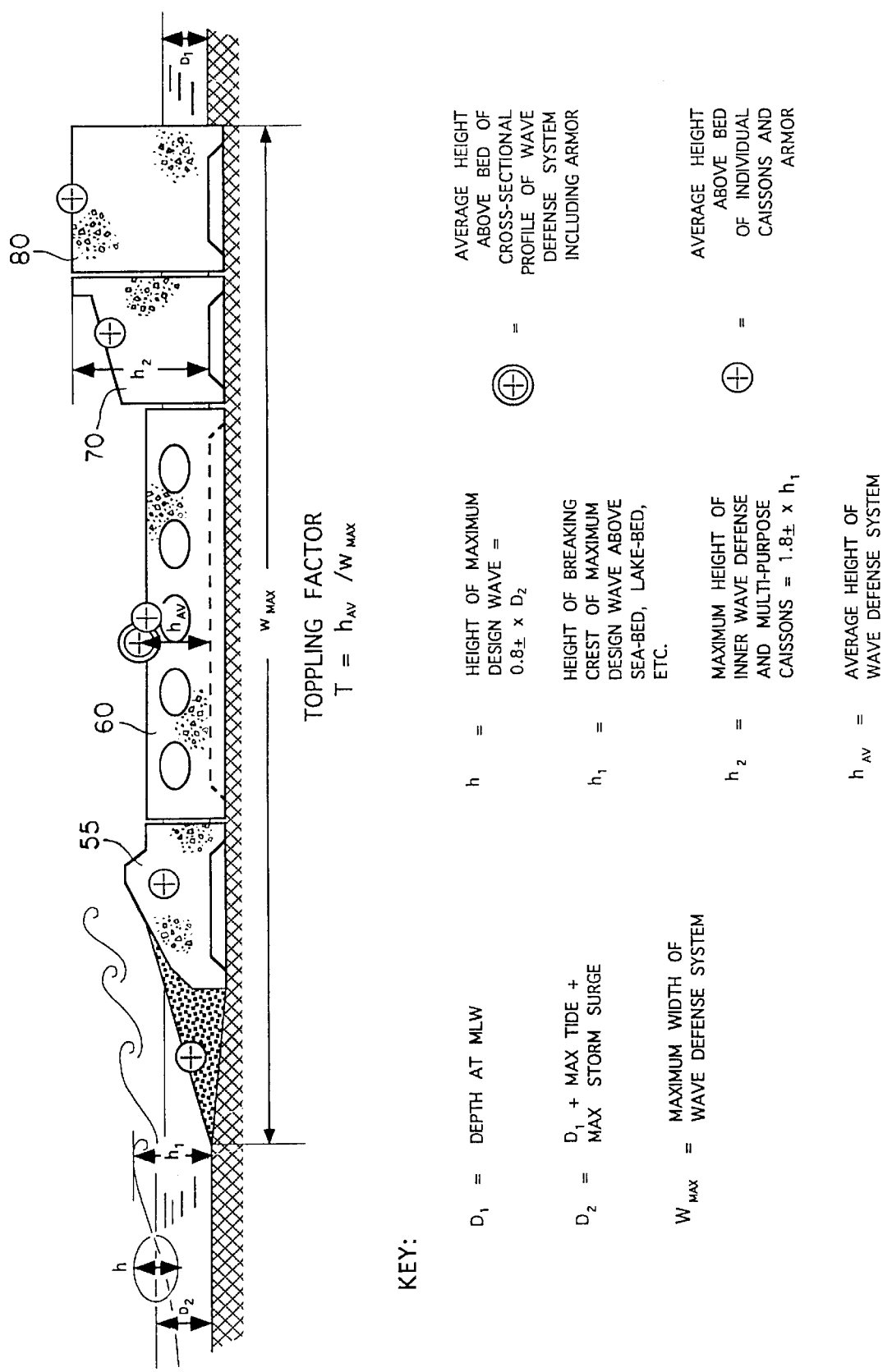

UNIVERSAL, ENVIRONMENTALLY SAFE, MODULAR CAISSON SYSTEMS AND CAISSON MUDULES FOR USE THEREWITH

This application is a continuation of application Ser. No. 07/766,632 filed Sep. 26, 1991, which is a continuation of application Ser. No. 07/578,761 filed Sep. 6, 1990, now U.S. Pat. No. 5,061,122.

BACKGROUND OF THE INVENTION

The present invention relates generally to modular caissons which can be assembled in different configurations to form wave defense systems in deep or shallow waters, and more particularly to standardized, modular caissons which are constructed onshore in the form of either monolithic caissons or caisson sub-assemblies which are assembled on site to form caissons, floated to a preselected site, trimmed and ballasted down to form a wave defense system.

In large, open bodies of water, the forces generated by maximum force winds and waves can vary greatly depending on the location of, and underlying conditions at, any particular site. Because of this great variation, it has heretofore not been possible to standardize the design of wave defense systems to any appreciable extent. Instead, wave defense systems have generally been designed as one-of-a-kind structures suited to the requirements of a particular site. This results in construction being undertaken at a location near or at the site in question, with little, if any, cost savings being available from standardized production methods, such as those available in shipyards and shipyard-type facilities.

Usual wave defense systems include breakwaters, groins, pilings, caissons and the like.

Caissons are typically constructed of concrete and/or steel and may be of either the floating or sunken type. A floating caisson floats on the surface and is anchored to the seabed, lake bed, etc. A sunken caisson, on the other hand, rests directly on the bed and may, depending on its construction, penetrate into the bed to aid in embedding the caisson in place.

Floating caissons present a danger of breaking loose in severe wind and wave conditions, such as during a hurricane or typhoon, regardless of how strongly the caissons are anchored. This is an extremely dangerous condition and results in a breach of the wave defense system which, in turn, destroys the integrity of the protected area behind the caissons. Similarly, sunken caissons, even though large enough to rest on, or even penetrate, the bed, also present a danger of breaking loose due to their hydrodynamic characteristics. For example, when severe storm waves and winds slam into the seaward side of a sunken caisson, the wind and wave forces create: a lifting force tending to lift the caisson off the bed; a turning moment tending to overturn the caisson; and a slamming force tending to move the caisson sideways—any of which, if large enough in magnitude, can lead to a caisson breaking loose thus resulting in a breach of the wave defense system.

By way of example, French Patent No. 1,012,795 dated Apr. 23, 1952 to Pascal Hermes discloses a sea wall made of sunken caissons. However, the caissons all have a greater height than width and are, therefore, likely to be toppled over when subjected to anything approaching maximum level wave and wind attack. This presents a serious drawback and severely restricts use of the sea wall to relatively shallow, protected waters. Another drawback is that the caissons appear to rest more or less on the surface of the seabed, with hardly any penetration into the bed, and thus are likely to be swept away by high waves. The caissons are not strongly anchored to the seabed and are not designed for use in deep, open waters subjected to severe wind and wave conditions. A further drawback is that the caissons have no additional use, other than their wave defense functions, so that their cost cannot be offset in any way other than by their wave defense function, i.e., the caissons have no revenue-earning capability. Another drawback is that the caissons are designed to be ballasted down but not ballasted up so that the caissons, once sunk into position, become a permanent structure. As a consequence, the caissons cannot be realigned or replaced and cannot be ballasted up and towed away for use at other locations, or for breakup in the event the sea wall has to be dismantled for environmental or other reasons. Because of these and other drawbacks, it is not believed that any sea wall using the caissons described in this patent has been built anywhere in the world.

Out in open waters, especially in deep water, breakwaters armored with riprap, concrete blocks, tetrapods, dolos, etc. represent the only viable method of constructing wave defense systems. At such locations, however, the cost becomes too high and constitutes a strong financial deterrent preventing the construction of breakwaters, especially in deeper, open waters which are exposed to maximum force winds and waves.

In addition, the problem of the extreme cost of constructing breakwaters and the like in deeper, open waters is compounded by the fact that such wave defense systems offer no additional economic benefits other than their value as a wave defense system. In short, the benefit/cost ratios of conventional wave defense systems are too low to justify their construction in open, deeper waters.

Another problem of using breakwaters as wave defense systems is that once the breakwater is breached, there generally is no second line of wave defense. Thus the area that had been protected by the wave defense system is open to the full force of wind and wave attack.

A further problem of constructing breakwaters massive enough to withstand severe hydrodynamic environments is that such breakwaters represent a large and permanent environmental "footprint" on the ocean floor, especially when the "core" thereof is made of dredged material. Due to their size, these breakwaters cannot be economically de-mounted and removed following the end of their useful life.

For the foregoing reasons, very few such wave defense systems have been actually constructed, for example, at deep water sites in the open ocean.

Further, those wave defense systems, such as breakwaters, that have been constructed in deeper, exposed waters cannot be built high enough, due to the prohibitive cost, to prevent wave over-topping, nor can they provide adequate protection on their lee sides from maximum strength winds. As a result, such wave defense systems do not provide adequate shelter on their lee sides for anchoring, docking or mooring vessels, especially when such wave defense systems are under maximum wind and wave attack. These conditions present a major problem for all vessels maneuvering at slow speed, or docking, or at anchor, especially vessels that have a high windage profile, such as container ships, cruise ships, tankers and bulk carriers, car carriers, and especially liquified gas carriers, such as LNG tankers and the like.

There are no known wave defense systems which can provide adequate shelter at deep water sites, as for example in the open ocean, when subjected to maximum wind and wave attack such as exists along, and off, the open coastlines surrounding the Atlantic, Pacific and Indian Oceans, for all classes of sea-going vessels engaged in commerce throughout the world.

Further complicating the construction of wave defense systems in large, open bodies of water such as the open ocean is the growing need to build any such system so that, at least from an environmental or navigational standpoint, it can be de-mounted and removed following the end of its useful life, thereby returning the ocean to, or as close as possible to, its pre-construction state.

SUMMARY OF THE INVENTION

One object of the present invention is to provide a wave defense system that overcomes the aforementioned problems associated with the prior art systems.

Another object of the present invention is to provide a universal wave defense system that can protect any coastline or shoreline against beach erosion, or any artificial manmade island, against any level of wave and wind attack, including those arising from maximum scale hurricanes, typhoons, cyclones and tsunamis.

A further object of the present invention is to provide a wave defense system capable of withstanding maximum force winds and waves generated at the site of the wave defense system.

Another object of the present invention is to provide a wave defense system which is economically and technically feasible and which is environmentally benign.

Another object of the present invention is to provide a wave defense system comprised of ballastable, trimmable, modular caissons which are designed and assembled to withstand maximum wind and wave attack in open, deeper waters and which can be easily scaled down for use in calmer, shallower waters.

Another object of the present invention is to provide a wave defense system in large, open bodies of water (including the open ocean) at depths usually ranging from 20 to 100 feet, although, under certain conditions, depths up to 150 feet may be considered.

A further object of the present invention is to provide a wave defense system comprised of a plurality of primary, ballastable, modular caissons that can be constructed under cost-controlled conditions in shipyards, floated and towed out to a desired site, precisely trimmed, and then ballasted down and assembled into position to form an integrated wave defense system.

Yet another object of the present invention is to provide a wave defense system comprised of ballastable, modular caissons which can be ballasted down to form an integrated wave defense system and which can, if desired, be ballasted up and towed away at the end of the useful life of the wave defense system to enable the site to be restored as closely as possible to its pre-construction state.

A further object of the present invention is to provide a set of primary, ballastable, trimmable, modular caissons of different configurations which can be assembled in different combinations to constitute a wide array of wave defense systems and which can be scaled to size for use at different preselected sites having different water depths and different maximum wind and wave conditions.

A still further object of the present invention is to provide a modular caisson system comprised of a given number of standardized, ballastable caissons which can be scaled to different sizes and which can be deployed in a multitude of different configurations to form wave defense systems under different site conditions.

A further object of the present invention is to provide a wave defense system having a line of outer wave defense caissons and having, depending on site conditions, a reinforcement sub-system which is integral with the outer wave defense caissons and which acts as a reinforcing support system for supporting the line of outer wave defense caissons and which comprises a series of transverse support caissons and inner wave defense and multi-purpose caissons.

Another object of the present invention is to provide a wave defense system having a line of outer wave defense caissons and having, depending on site conditions, a wave over-topping absorption, containment and dispersion sub-system which is integral with the outer wave defense caissons and which is comprised of transverse support caissons and inner wave defense caissions for absorbing, containing and dispersing the energy of waves over-topping the line of outer wave defense caissons.

These as well as other objects, features and advantages of the invention are attained by providing a plurality of primary, ballastable, modular caissons of different configurations which can be assembled in different combinations to form a wide array of wave defense systems and which can be scaled to size for use at different preselected sites having different depths and subjected to different maximum force winds and waves. The primary, ballastable, modular caissons comprise anchor tower caissons, outer wave defense caissons, transverse support caissons, inner wave defense caissons, and multipurpose caissons.

The outer wave defense caissons are designed to be assembled in end-to-end relation to form a line which is anchored at one or both ends by an anchor tower caisson. A reinforcement sub-system may be provided for reinforcing the line of outer wave defense caissons, the reinforcement sub-system comprising one or more lines of inner wave defense caissons and multi-purpose caissons disposed on the leeward side of the line of outer wave defense caissons and integrated therewith through a series of transverse support caissons. In deep, open bodies of water, a wave overtopping absorption, containment and dispersion sub-system may be provided for absorbing, containing and dispersing the energy of waves over-topping the line of outer wave defense caissons. All of the primary, ballastable, modular caissons are designed to be constructed onshore in shipyard-type facilities, and then floated to the desired site, trimmed and ballasted down to form the integrated wave defense system.

The foregoing as well as other objects, features and advantages of the invention will become apparent to those of ordinary skill in the art upon a reading of the following detailed description of the invention when read in conjunction with the accompanying drawings.

BRIEF DESCRIPTION OF THE DRAWINGS

FIGS. 8a–8g are side elevations of standardized, primary, ballastable modular caissons which constitute the modular caisson system of the present invention;

FIGS. 8h–8k are explanatory side elevations for use in explaining the design principles of the outer wave defense caissons according to the present invention;

FIG. 10a is a side elevation, partly in cross section, and FIG. 10b is a top plan of a typical wave defense system under minimum site conditions and at a minimum commercial depth;

FIG. 11a is a side elevation, partly in cross section, and FIG. 11b is a top plan of a typical wave defense system under intermediate site conditions and at an intermediate commercial depth;

FIG. 12a is a side elevation, partly in cross section, and FIG. 12b is a top plan of a typical wave defense system under maximum site conditions and at a maximum commercial depth.

FIGS. 13a–13c are explanatory side elevational views, partly in cross section, of typical integrated wave defense systems in shallower, more protected waters under varying hydrodynamic and site conditions;

FIG. 15 is an explanatory cross-sectional view of a wave defense system designed for maximum hydrodynamic and site conditions for use in explaining the toppling factor.

DETAILED DESCRIPTION OF THE INVENTION

Figure 1:
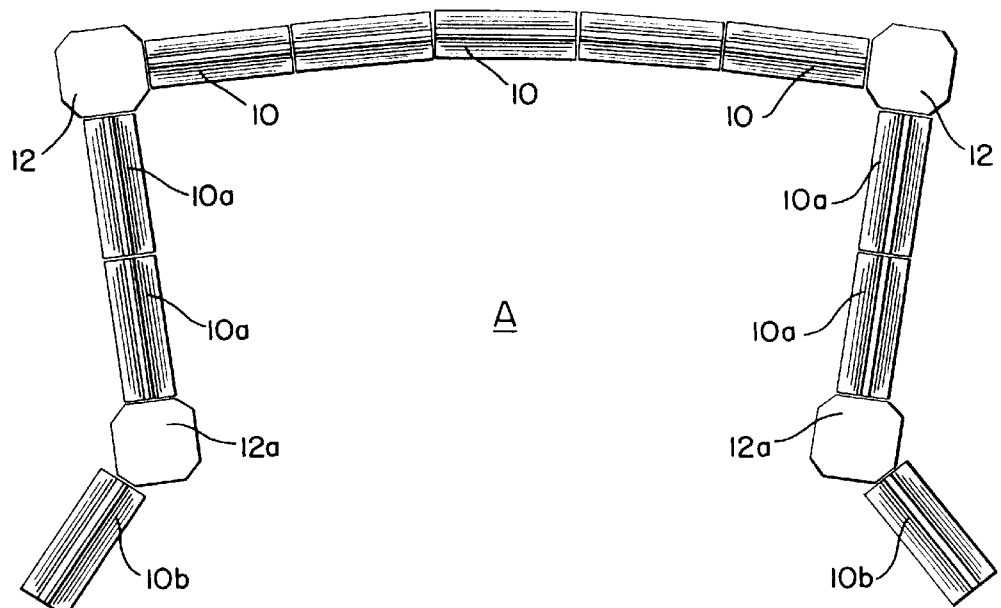
FIG. 1 is an explanatory plan view showing one exemplary embodiment of a sea defense system constructed according to the principles of the present invention.

To facilitate understanding of the modular caisson concept utilized in the present invention, a brief general description will be given of several illustrative wave defense systems constructed of modular caissons according to the invention followed by a description of representative standardized, primary, modular caissons which make up the modular caisson system. It is understood that the several illustrative embodiments of wave defense systems are merely representative of the multitude of different wave defense systems that can be constructed according to the principles of the present invention and that the invention is in no way limited or restricted to the particular configuration of wave defense systems illustrated in the drawings.

As used throughout the specification and claims, the term "wave defense system" refers to and means a system used in waters of any type, such as oceans, seas, bays, rivers, lakes, estuaries and the like. A wave defense system used in the ocean or sea is sometimes referred to as a "sea defense system". The protected, sheltered area on the leeward side of a wave defense system, or enclosed or partly enclosed by a wave defense system, is referred to as a "manmade island" because it is surrounded or substantially surrounded by relatively unprotected water. In other words, the protected area is a manmade refuge surrounded by unprotected water. The protected area may be filled, or partly filled, with sand, rock, gravel or other fill material to constitute a land island, or the protected area may remain filled with water to constitute a water island.

The term "primary" caisson refers to and means a ballastable, modular caisson which functions as a structural module in the integrated modular wave defense system. A primary caisson may, in addition, be designed to perform other functions, such as material processing, material storage, wave energy dissipation, etc. By contrast, a "secondary" caisson is one which functions in a capacity other than as a structural module in the integrated modular wave defense system.

General Description of Illustrative Wave Defense Systems Using Modular Caissons One embodiment of a wave defense system constructed of ballastable, modular caissons according to the present invention is shown in FIG. 1, which is an explanatory plan view of a wave defense system constructed at a preselected ocean site in the open ocean. As the wave defense system in this embodiment is in the ocean, it will be referred to as a sea defense system. The sea defense system is comprised of a main line of outer wave defense caissons 10 which, as described hereinafter, are secured in place on the ocean floor and project above the ocean surface. The wave defense caissons 10 are positioned in end-to-end relation, and any number of caissons 10 may be used depending on the desired size of the protected area and the scale of the maximum wind and wave forces generated at the selected site. An anchor tower caisson 12 is positioned at the end of each of the endmost caissons 10 in the main line of wave defense caissons.

The anchor tower caissons 12 are securely embedded in the ocean floor and anchor the line of outer wave defense caissons 10 to form an integrated wave defense system. In this embodiment, the upper parts of the anchor tower caissons 12 extend above the level of the ocean surface.

In the embodiment shown in FIG. 1, the wave defense caissons 10 are arranged in a line which preferably curves outwardly in the direction of the prevailing winds and waves, thereby creating a manmade island in the form of a protected area A on the leeward side of the line of caissons. To further enclose and shelter the protected area A, secondary lines of wave defense caissons 10a are connected to the anchor tower caissons 12 and extend transversely thereof in the leeward direction. Additional anchor tower caissons 12a are connected to the ends of the endmost wave defense caissons 10a and, as a further measure of protection, additional wave defense caissons 10b are connected to the anchor tower caissons 12a.

As shown in FIG. 1, the outwardly curved main line of outer wave defense caissons 10 defines, relative to the oncoming winds and waves, an arch structure which is anchored at both ends by the corner anchor tower caissons 12. In accordance with classic "arch theory", such an arch-shaped arrangement of outer wave defense caissons 10 can withstand much greater wind and wave forces than would otherwise be possible if the caissons 10 were arranged in a straight line. The integrity of the sea defense system is further strengthened by the lines of wave defense caissons 10a which extend radially inwardly, like the spokes of a wheel, toward the centers of curvature of the curved main line of outer wave defense caissons 10.

In accordance with the invention, the particular number of wave defense and anchor tower caissons, and the arrangement of the caissons, will depend on the desired size of the area to be protected, the depth of the water at the selected site, the scale and direction of the maximum wind and wave forces generated at the selected site, and other factors. For example, one or more anchor tower caissons 12 may be interposed along the main line of wave defense caissons 10 in addition to the two corner anchor tower caissons. The leeward side of the protected area A may, if desired, be closed with a line of wave defense caissons 10 to completely enclose the protected area A. A sea lock may also be provided, either in one of the caissons or between two adjoining caissons, to permit vessels to enter and exit the protected area A. By way of example, the area A protected by the sea defense system may be made as small as, for example, 20 acres or as large as up to 1000 acres or more.

Figure 2:
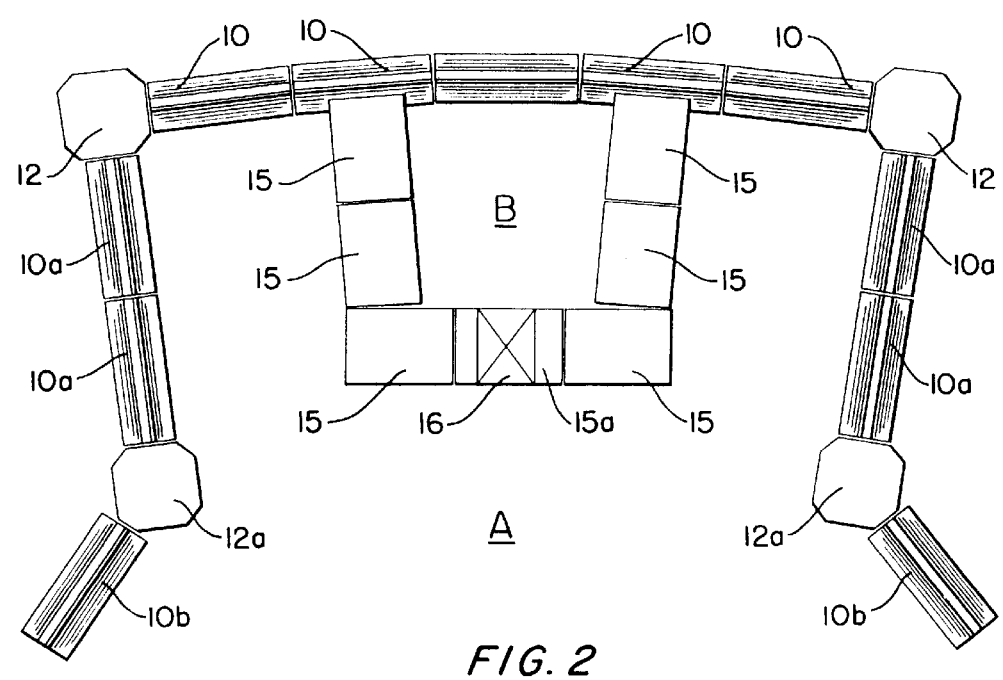
FIG. 2 is an explanatory plan view of another exemplary embodiment of a sea defense system constructed according to the principles of the present invention.

FIG. 2 shows another embodiment of integrated sea defense system installed in the ocean and in which a plurality of multi-purpose caissons 15 are provided on the leeward side of the line of outer wave defense caissons 10 in the protected area A. In this embodiment, the multi-purpose caissons 15 are arranged in a closed ring or loop configuration with the line of wave defense caissons 10 to form an enclosed area B. In this arrangement, two of the multi-purpose caissons 15 are connected to the leeward sides of two wave defense caissons 10, and the caissons 15 are interconnected to one another to completely enclose the area B.

The enclosed area B may remain filled with water to form a wet polder. One of the multi-purpose caissons 15a may be provided with a sea lock 16 for permitting vessels to enter and leave the enclosed area B. In the case of a wet polder, the body of water in the enclosed area B is completely surrounded by caissons and, from an environmental standpoint, this presents an ideal area for transferring bulk materials between vessels and the multi-purpose caissons 15 which, in that case, would be used as storage caissons. In the event of a spill or other unwanted discharge, the discharged material will be confined to the body of water within the enclosed area B, thereby enabling economic and thorough cleanup of the discharged material. The wet polder thus functions as a secure spill containment area.

Alternatively, the water within the enclosed area B may be removed and replaced by a desired level of dry fill material to form a dry polder. The fill material may be dredged from the ocean floor or may be manufactured materials. In the event the fill materials are subject to leaching wastes into the ocean, the inner walls of the caissons and the floor of the dry polder can be lined with impervious linings to prevent leaching, thus creating an environmentally secure dry material containment area.

The multi-purpose caissons 15 function to further strengthen the integrity of the sea defense system. As shown in FIG. 2, the multi-purpose caissons 15 extend in end-to-end relation transversely of the line of outer wave defense caissons 10 and are preferably arranged in lines that extend radially inwardly, like the secondary lines of wave defense caissons 10a, toward the centers of curvature of the curved main line of outer wave defense caissons 10.

The multi-purpose caissons 15, being on the leeward side of the line of wave defense caissons 10, need not be as seaworthy as the caissons 10. The multi-purpose caissons may be equipped with the necessary piping, access openings and the like to permit the transfer of bulk materials into and out of the caissons to enable the multi-purpose caissons 15 to be used as storage caissons, or to be used for manufacturing, processing or other activities.

Figure 3:
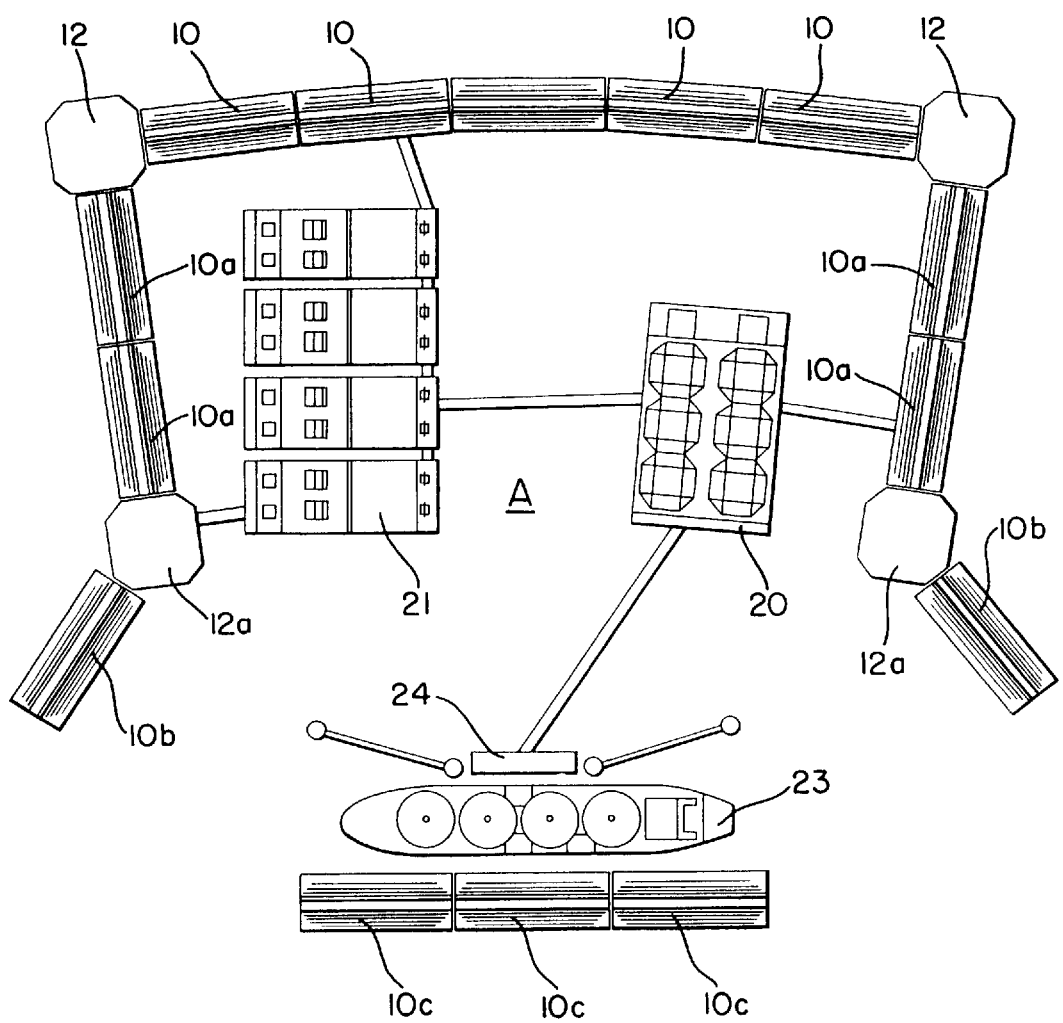
FIG. 3 is an explanatory plan view of a further exemplary embodiment of a sea defense system constructed according to the principles of the present invention.

Another embodiment of integrated sea defense system constructed of ballastable, modular caissons installed in the ocean is shown in FIG. 3. In this embodiment, a marine storage platform 20 and a marine power plant 21 are anchored or otherwise secured in the protected area A of the manmade island. A line of wave defense caissons 10c, in this case three, are provided at the leeward side of the protected area A to provide a sheltered area for a tanker or other vessel 23. By way of example, the vessel 23 may be an LNG tanker for delivering liquified natural gas to the storage platform 20 for use by the power plant platform 21 in generating electric power. A loading jetty 24 is provided adjacent the docking area, and suitable conduits, pumps and the like are provided for transporting the liquified natural gas to the various facilities. The sea defense system can likewise be used to generate electric power using liquified petroleum gas or bunker "C" or diesel oil, etc. The sea defense system may also be used to process other materials, such as petroleum products, petrochemicals and other chemicals, waste materials, etc., or as a storage complex, or for other uses.

Figure 4:
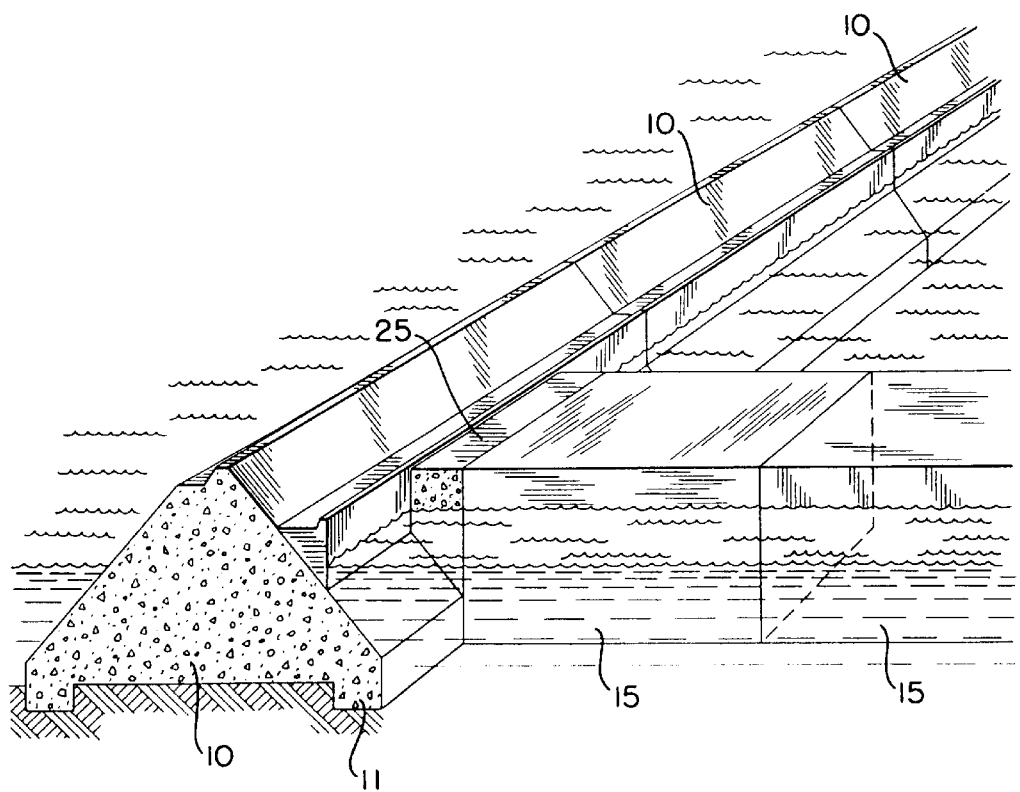
FIG. 4 is an explanatory perspective view, partly in section, showing the assembly of wave defense caissons and storage caissons.

FIG. 4 shows the general configuration of the ballastable, modular wave defense caissons 10 and multi-purpose caissons 15. The ballastable wave defense caissons 10 are preferably all of similar shape and construction. Each caisson 10 has a tapered cross section that tapers outwardly in a direction from the top to the bottom of the caisson. The bottom of the caisson 10 is provided with an annular skirt 11 which, as described hereinafter, helps secure the caisson bottom to the ocean floor by suction. The wave defense caissons 10 are preferably comprised of reinforced concrete. The caissons 10 are constructed onshore as ballastable modules and, to help render the modular caissons sufficiently buoyant to be floated to the desired ocean site and then ballasted down to the ocean floor, ballast chambers are preferably formed internally within the caissons. To provide additional ballasting capability and/or buoyancy, external detachable buoyancy enhancement devices can be used.

The ballastable multi-purpose caissons 15 preferably have a rectangular cross section to simplify their manufacture and maximize their utility for multi-purpose uses. The multi-purpose caissons need not be as rugged as the wave defense caissons 10 and thus can be manufactured more easily and at lesser expense. To enable connection of the multi-purpose caissons 15 to the sloped lee sides of the wave defense caissons 10, an interface caisson 25 or the like is provided, the interface caisson being configured to mate on one side with the sloped lee side of the wave defense caisson 10 and on the other side with the end of the multi-purpose caisson 15 or, alternatively, with the end of a transverse support caisson (which is described later). By such a construction, wind and wave forces exerted on the seaward side of the outer wave defense caisson 10, which would tend to turn the caisson, will wedge the interface caisson 25 more tightly between the wave defense and multi-purpose caissons thereby increasing the resistance to turning of the wave defense caisson 10. The use of an interface caisson 25 is limited to those configurations where this caisson can be lifted and set in place by a floating crane. For situations where this is not possible, another solution has been devised, which is the use of an outer wave defense caisson having a vertical leeward face, as shown in FIG. 8d and described hereinafter. The multi-purpose caissons 15 are preferably comprised of reinforced concrete, constructed onshore as ballastable modules, and floated to the desired ocean site.

Figure 5:
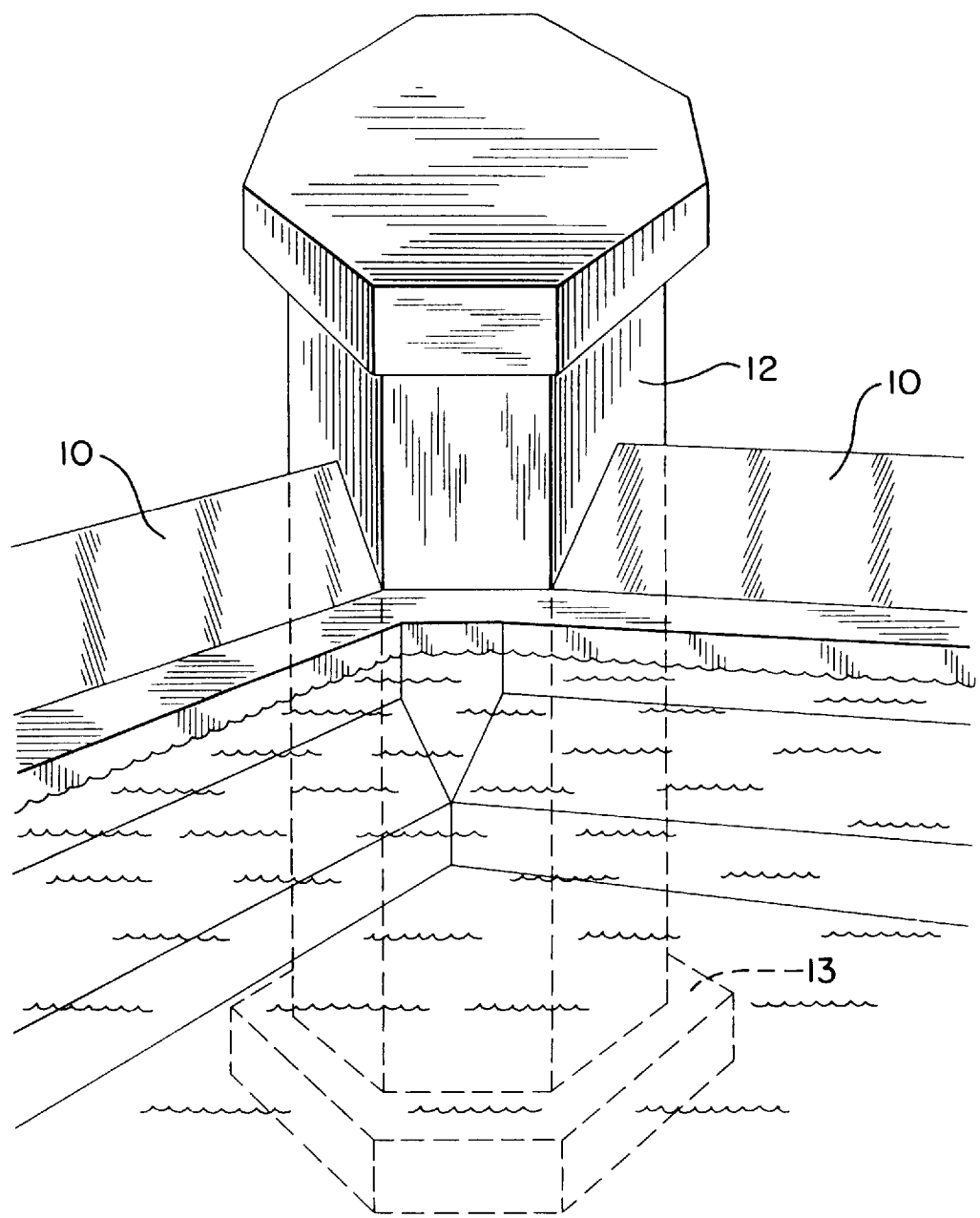
FIG. 5 is a perspective view showing the assembly of an anchor tower caisson and wave defense caissons.

FIG. 5 shows an example of a ballastable, modular anchor tower caisson 12 connected to two wave defense caissons 10. The anchor tower caisson 12 preferably has a polygonal cross-section and, like the wave defense caissons 10, is preferably comprised of reinforced concrete. As shown in FIG. 5, the anchor tower caisson 12 has an annular skirt 13 which defines a recessed bottom portion of the caisson. The anchor tower caisson 12 preferably has a greater height than that of the wave defense caissons 10, especially when deployed in deep open bodies of water, and extends into the ocean floor a much greater depth than the wave defense caissons.

A description will now be given, with reference to FIGS. 6 and 7, of the method of manufacturing and assembling the illustrative sea defense systems shown in FIGS. 1–3. After selection of the desired ocean site, construction of the wave defense caissons and anchor tower caissons is carried out, to the maximum extent possible, in shipyard-type facilities onshore. The relative dimensions of the wave defense caissons are determined based on various factors, as described in more detail hereinafter, including the topography of the ocean floor in the vicinity of the selected site and the maximum force winds and waves that may be encountered at the site under "worst case" storm conditions. After determination of a set of maximum wave and wind forces, the maximum lifting and turning moment forces are calculated for the wave defense caissons. Then, after the addition of an appropriate safety factor, these forces, in turn, are used to determine the mass and the precise cross-sectional design of the wave defense caissons for the selected ocean site.

After onshore construction of the wave defense caissons and anchor tower caissons, the caissons are made sufficiently buoyant to float in the ocean to the selected site. This may be done by filling ballast chambers formed in the caissons with air and/or attaching buoyancy tanks to the caissons. Should this not provide sufficient buoyancy to float the caisson, additional buoyancy can be obtained by attaching additional external buoyancy enhancement devices, such as flotation "collars" and the like. The caissons 10 are then floated to the selected site, for example, by being towed by a tugboat or other vessel.

Figure 6:
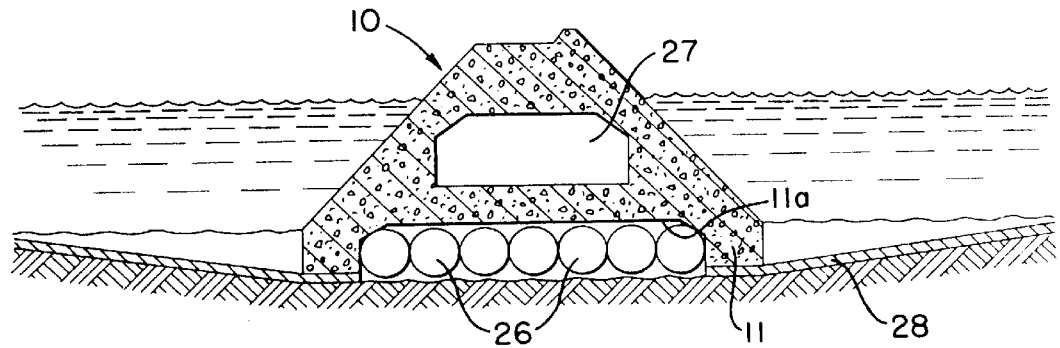
FIG. 6 an explanatory cross-sectional view for use in explaining the construction of a sea defense system according to the principles of the present invention.
Figure 7:
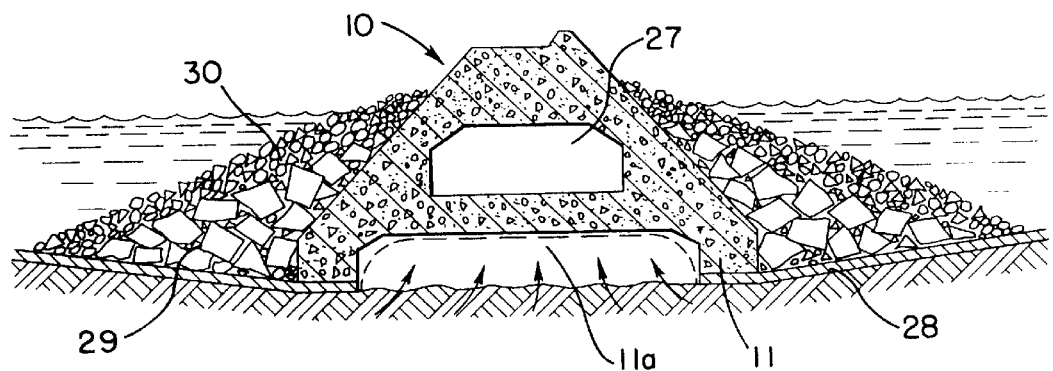
FIG. 7 is an explanatory cross-sectional view for use in explaining the construction of a sea defense system according to the principles of the present invention.

As shown in FIG. 6, the ocean floor at the selected ocean site is suitably prepared to receive the caissons. For this purpose, a channel is dredged in the ocean floor to a depth at least as deep as the height of the caisson skirt 11. The sides of the channel are graded outwardly, in a direction away from the channel, so that the ocean floor gradually slopes upwardly on either side of the channel. The ocean floor is preferably graded to a vertical extent equal to or slightly greater than the height of the caisson skirt 11. In order to maintain the integrity of the ocean floor and to assist in distributing the weight of the caisson and the subsequently deposited material and/or armoring, one or more mats 28 may be laid over the graded areas. As shown, the mats 28, in this example, overlie the marginal edge portions of the channel to an extent coterminous with the caisson skirt 11.

After preparation of the ocean floor, the wave defense caisson 10 is floated into position over the dredged channel and then trimmed and ballasted down and sunk into place. This condition is shown in FIG. 6. The sinking of the caisson is accomplished by filling the ballast chambers 27 (only one of which is shown) in the caisson 10 with water and progressively removing the buoyancy tanks 26 and any other external buoyancy enhancement devices so that the caisson gradually descends to the ocean floor. To precisely trim the caisson 10 as it descends, a plurality of separate ballast chambers are preferably formed in the caisson at prescribed locations, and the flow of water into and out of the ballast chambers is individually controlled to effect precision trimming. After the caisson 10 is properly positioned in the dredged channel, any remaining buoyancy tanks 26 or other buoyancy enhancement devices are removed so that the caisson, due to its weight, settles onto the ocean floor. A material 29 is thereafter deposited on and around the sloped sides of the caisson 10, as shown in FIG. 7. Then a protective armoring 30 of varying size riprap and concrete blocks is deposited over both the material 29 as well as over the exposed side surfaces of the sunken caisson 10. The added material 29 may comprise sand and gravel dredged from the ocean floor or may comprise rocks or even manmade structures such as concrete. Preferably, the added material 29 comprises a first layer of material dredged from the ocean floor covered by overlying layers of rock and, finally, concrete blocks, etc.

The combined weight of the caisson 10, added material 29 and armoring 30 causes the caisson 10 to sink a certain depth into the ocean floor. The downward pressure exerted by the bottom of the caisson 10 on the ocean floor causes mud silt from the ocean floor, which is the most likely condition to be encountered, to fill the void formed by the skirt 11. Stated otherwise, as the caisson 10 settles on the ocean floor, the seawater within the recessed bottom 11a of the caisson is displaced by mud silt from the ocean floor. The filling of the void with mud silt enables a suction to be created to further secure the caisson 10 to the ocean floor. Thus if a lifting force or turning moment is applied to the caisson 10, the tendency of the caisson to lift or turn will, in part, be counteracted by the creation of a suction force at the recessed bottom 11a of the caisson.

The wave defense caisson 10 is designed such that the combined weight of the caisson, added material 29 and armoring 30 is sufficient to offset lifting forces tending to lift the caisson, turning moments tending to turn the caisson and slamming forces tending to shift the caisson which are created by maximum storm winds and waves for which the sea defense system has been designed to withstand at the selected ocean site. By such a design and construction, the caisson 10 is firmly secured in place on the ocean floor. Additional securement is provided by the suction created due to the mud silt filling the voids at the recessed bottoms of the caissons.

In the construction of a sea defense system, the wave defense caissons 10 are constructed, to the maximum extent possible, in shipyard-type facilities onshore and floated to the selected site, trimmed, and successively ballasted down to the ocean floor. After one caisson is properly positioned in place, the next-in-line caisson is ballasted down into position and connected to the previous one. Alternatively, connection can take place while caissons are still in a trimmable condition and before final settlement. Any suitable connection may be employed, and the facing ends of adjoining caissons are provided with connectors (not shown) to facilitate the connection. These connectors may be of one or more types, the simplest being cables and winches and the most complex involving interlocking connectors.

Before the main line of outer wave defense caissons 10 is secured in place, the first anchor tower caisson 12 is floated into position and ballasted down and set in place on the ocean floor. The endmost wave defense caisson 10 is then connected to the anchor tower caisson 12, as shown in FIGS.

1–3. The anchor tower caissons 12, like the wave defense caissons 10, are constructed onshore to the maximum extent possible and floated to the selected site. The anchor tower caissons 12 are also provided with recessed bottoms for creating suction forces to assist in anchoring the caissons to the ocean floor. In the case of the anchor tower caissons 12, the ocean floor preparation requires the dredging of a much deeper channel as these caissons extend to a significantly deeper depth than the wave defense caissons 10 and are firmly embedded in the ocean floor (see description of penetration factor with reference to FIG. 16).

After construction of the main line of wave defense caissons 10 and corner anchor tower caissons 12, other ballastable, modular caissons can be assembled, as needed, to obtain the desired integrated sea defense system. In the case of the FIG. 1 embodiment, this includes the construction and assembly of the secondary line of wave defense caissons 10a, 10b and the anchor tower caissons 12a. In the case of the FIG. 2 embodiment, this includes the construction and assembly of the multi-purpose caissons 15 and, if desired, construction of a dry polder in the enclosed area B. In the case of the FIG. 3 embodiment, this includes the construction and assembly of the wave defense caissons 10c.

In accordance with the invention, the sea defense system is constructed of ballastable caisson modules which can be easily de-mounted and removed from the ocean site so as to restore the site to its pre-construction state. To effect de-mounting of the sea defense system, the caissons are disconnected from one another so that each may be separately removed. In order to dislodge the wave defense caissons 10 and the anchor tower caissons 12 from the ocean floor, compressed air is injected into the recessed bottoms of the caissons through conduits (not shown) to break the suction. The seawater is pumped out of the ballast chambers formed in the caissons, and air is pumped into the chambers to increase the buoyancy of the caissons. Additional buoyancy tanks or the like are secured, as needed, to the caissons to impart sufficient buoyancy to float the caissons to the surface where they can be towed away, either for re-use at another site or for destruction. The added material and armoring can then be either removed or spread more evenly along the ocean floor so as to create fishing reefs. In this manner, the sea defense system can be de-mounted and removed at low cost and without leaving any significant permanent environmental change.

In accordance with the invention, a wave defense system can be constructed in the open ocean at sites in water depths up to 150 feet. In theory, the wave defense system could be constructed for use at even deeper depths, though it is estimated that the size and cost of the caissons would make construction impractical at depths beyond 150 feet. The wave defense system is particularly suited for use at mean-low-water depths in the range of 20 to 80 feet, with 80 feet being currently the accepted maximum mean-low-water channel depth for any commercial operations. The wave defense system is particularly suited for use at site locations in large, open bodies of water, such as along coastlines or offshore in the ocean, as well as site locations in shallower, more protected waters, such as bays, estuaries, rivers and lakes.

Detailed Description of Modular Caisson System

In accordance with the present invention, a system of standardized, ballastable, trimmable modular caissons is provided for constructing universal, manmade wave defense systems for use over a wide range of site conditions in bodies of water of various types and depths and subjected to any kind of storm or tsunami. The modular system comprises different types of primary modular caissons of standardized shapes and proportions, wherein each different type of caisson module is designed to perform one or more specific functions in the overall wave defense system. The caisson modules can be suitably scaled to size and assembled in different combinations to construct a multitude of differently configured wave defense systems.

The individual caisson modules can be manufactured, to the maximum extent possible, under cost-controlled conditions in shipyards or shipyard-type facilities onshore and then towed to, and assembled at, the site where the wave defense system is required. The caisson modules are capable of being scaled and assembled in different combinations, so that the overall scale and modular assembly of the wave defense system is capable of withstanding and overcoming the maximum hydrodynamic and wind forces that can be generated at a preselected site, with no larger modules, nor greater number of modules, nor greater degree of modular assembly, being utilized than are absolutely necessary for that particular site.

The wave defense system is designed so that no wave over-topping occurs, so that the area on the lee side of the system is fully protected to form a manmade or artificial island to provide secure maneuvering, docking and anchoring areas for all types of vessels, even when the site is subjected to maximum wind and wave attack.

Due to the modular nature of the wave defense system, the caisson modules can be readily removed, if desired, at the end of the useful life of the wave defense system, thereby returning the site as closely as possible to its pre-construction state. This is an important consideration in this era of increasing environmental awareness and regulation.

In accordance with one aspect of the invention, the modular caisson system consists of a plurality of different types of primary, ballastable, trimmable caissons which may be assembled in combinations of two or more types to construct different manmade wave defense systems. In the preferred embodiment, there are five fundamental types of primary, standardized, ballastable modular caissons which constitute the basic building blocks of all the wave defense systems. The five primary, ballastable caissons are shown to scale relative to one another in FIG. 8. The five primary modular caissons comprise anchor tower caissons, outer wave defense caissons, transverse support caissons, inner wave defense caissons and multi-purpose caissons. One or more of the types of primary caissons, or all five, can be combined to form integrated wave defense systems, various examples of which are shown in FIGS. 1–3 and 10–13.

FIG. 8a shows a side elevation of an anchor tower caisson 40 embedded on the ocean floor. The anchor tower caisson 40 preferably has a polygonal cross section and has an annular skirt 41 which defines a recessed bottom portion of the caisson to aid in securing the caisson bottom to the ocean floor by suction. The anchor tower caisson 40 is similar to the previously described anchor tower caissons 12. A modified form of anchor tower caisson 45 is shown in FIG. 8b, and such comprises a truncated version of the anchor tower caisson 40.

For purposes of illustration, all of the primary caissions described herein are shown as having recessed bottom portions. In certain circumstances, however, such as when the floor of the dredged trench (in which the caissons are sunk) is of a hard material, such as a hard clay, the recesses in the bottom portions may be dispensed with. This is because in hard material the recessed bottoms of the caissons loose their ability to act as "suction cups", which is their function in soft material such as a silt or silt/clay. The decision as to whether to use caissons with or without recessed bottom portions depends on whether or not the outside peripheral edges of the recessed bottoms are capable of aiding the caisson bottoms to penetrate into the hard floor of the trench, which depends primarily on the soil mechanics of the particular site in question. Further, it should be noted that when conditions beneath the floor or bed are extremely fluid, it may be necessary to drive piling clusters deeply into the bed, or use other well-established methods, to further support the anchor tower and other caissons.

There are several main purposes of the anchor tower caissons 40. One is to anchor the ends, or one end, of the wave defense system by providing a substantial mass firmly embedded in the seabed, lake bed, river bed, etc. to assist in maintaining the integrity of the wave defense system between the ends thereof or between one end thereof and the shore. Another purpose is to provide a high and readily identifiable radar target for vessels approaching the wave defense system, thus providing an important navigational aid to ships and planes in the neighborhood of the system. Another purpose is to provide a high location overlooking the wave defense system to house a command and control center for excercising vessel traffic control, fire control, security control, air-sea rescue control, disaster control, etc. In addition, the top decks of the relatively high anchor tower caissons 40 are ideal locations for helicopter landing pads to allow for optional use of helicopters to transport personnel, supplies, etc. and to assist in carrying out the various control functions.

To enable the anchor tower caissons 40 to perform these functions, the caissons must rise a major distance above the height of the other modular caissons of the wave defense system. Further, due to the height of the caissons 40, they provide optimal locations for garaging and maintaining all of the mobile wheeled vehicles used at the installation, while providing ample space for administrative offices, first aid facilities, dormitories, cafeterias, stores, etc.

By comparison, there is no reason for the truncated anchor tower caissons 45 to rise above the height of the other modular caissons of the wave defense system. The main function of the truncated anchor tower caissons 45 is to provide additional support to sections of the wave defense system at points between the end anchor tower caissons, especially where the length of any section is unusually long and therefore may require added support. The truncated anchor tower caissons 45 are typically interspersed along a line of wave defense caissons and ideally should be at the same height as the wave defense caissons to facilitate provision of a service road running the length of the wave defense system. In such a case, the top decks of the truncated anchor tower caissons 45 can be used as parking areas for vehicles, such as during emergency situations and the like.

Figure 8L:
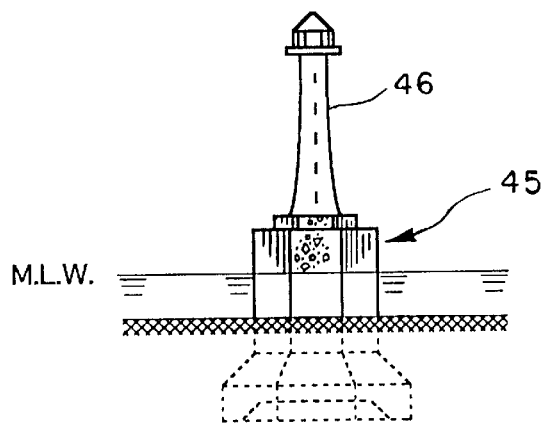
FIGS. 8l–8m are side elevations of variants of the anchor tower caisson shown in FIG. 8b.
Figure 8M:
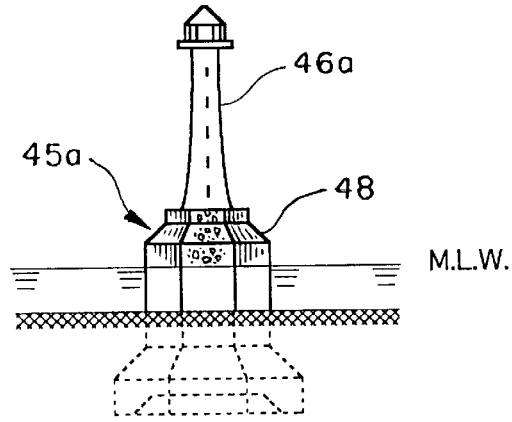

Another use for the truncated anchor tower caissons 45 is as a base for supporting a lighthouse which would function as an alternative aid to navigation. FIG. 8*l* shows a lighthouse 46 constructed atop the truncated anchor tower caisson 45, and FIG. 8*m* shows a lighthouse 46*a* constructed atop a slightly modified truncated anchor tower caisson 45*a* having, for technical and aesthetic reasons, a sloped upper section 48 which slopes inwardly in the upward direction so that the anchor tower caisson and lighthouse merge together more gradually and gracefully than in the case of FIG. 8*l*. The provision of a lighthouse is particularly suited for aesthetic and visual impact reasons in the case of wave defense systems used for coastal protection and placed within sight of shore.

In some instances, the height of the truncated anchor tower caissons 45 may be less than that of the line of wave defense caissons. For example, in a wave defense system requiring sluice gates, the sluice gates would be incorporated in the truncated anchor tower caissons which, in that case, would have a height below that of the wave defense caissons so that the height of the sluice gates, when fully raised, is approximately the same as the height of the adjoining wave defense caissons. In other words, the top deck of the truncated anchor tower caissons would be located below the level of the top of the line of wave defense caissons.

FIGS. 8*c* and 8*d* show side elevations of two different outer wave defense caissons 50 and 55. Each of the caissons 50 and 55 is provided with an annular skirt 51 to assist in securing and holding the caissons to the ocean floor by suction. The outer wave defense caisson 50 is designed for use at sites subjected to minimum "worst case" hydrodynamic conditions at minimum commerical depths, whereas the outer wave defense caisson 55 is designed for use at sites subjected to maximum "worst case" hydrodynamic conditions at maximum commercial depths. The outer wave defense caisson 50 is similar to the previously described wave defense caissons 10 and has a tapered cross section that tapers outwardly in the downward direction on both the windward and leeward sides 52 and 53 of the caisson. In this design, the slope of the windward side 52 is the same as that of the leeward side 53, and the two sides slope outwardly for a major part of their downward extent.

The outer wave defense caisson 55 is designed somewhat differently than that of the outer wave defense caisson 50 and has its center of gravity shifted in the leeward direction as compared to that of the caisson 50. The windward side of the caisson 55 has a split slope having an upper sloped portion 56*a* having a relatively gradual rise and a lower sloped portion 56*b* having a relatively steep rise. The caisson 55 is designed so that most or all of the upper sloped portion 56*a* extends above the water surface (at mean low water) and most or all of the lower sloped portion 56*b* lies below the water surface. The leeward side of the caisson 55 has a sloped top portion 57 and a generally horizontal ledge porton 58, both of which are disposed entirely above the water surface, and a vertical portion 59 which is provided to accommodate placement of transverse support caissons, as described below. As shown in FIG. 8*d*, the upper part of the outer wave defense caisson 55 has a tapered cross section that tapers outwardly in the downward direction on both the windward and leeward sides in the region of the opposed sloped portions 56*a* and 57.

While the two forms of wave defense caissons 50 and 55 are both designed for use as outer wave defense caissons, the caisson 50 is designed for use at locations subjected to minimum "worst case" wave and wind conditions whereas the caisson 55 is designed for use at locations, generally in deeper waters, subjected to maximum "worst case" wave and wind conditions. This will be explained in more detail with reference to FIGS. 8*h*–8*k*.

Outer wave defense caissons for use in large, open bodies of water must be designed to withstand maximum scale wind and wave attack, such as that of a maximum scale hurricane, typhoon, cyclone or tsunami. Maximum scale waves tend to slam and lift any caisson they encounter because the buoyancy of the caisson is increased as the wave impinges on the caisson. When the wind forces pressing against the windward face of the caisson are added to the slamming and lifting forces created by the waves, turning moment forces are generated which, when combined with the tendency of the caisson to be lifted by the waves, can result in the caisson being raised from its position on the seabed, lake bed, etc. and turned over (toppled) and swept away (see description of toppling factor with reference to FIG. 15). Under such conditions, the integrity of the wave defense system can be broken, leading to widespread destruction on the leeward side.

A wave defense caisson having vertical windward and leeward faces will be subjected to greater relative lifting and slamming forces, and have a greater potential turning moment, than will a caisson of similar width but with sloping windward and leeward faces. For these reasons, the outer wave defense caisson 50 shown in FIG. 8h was designed with sloping rather than vertical faces. The caisson 50 has the preferred cross section for outer wave defense caissons for use in the open ocean for a wide range of hydrodynamic and site conditions. It has been found, however, that the cross section of the caisson 50 is not optimal for meeting the engineering design requirements under the most severe hydrodynamic and site conditions such as might occur in large, open bodies of water up to a maximum commercial depth. Under maximum hydrodynamic and site conditions, the outer wave defense caisson 50 would have to be so large as to be unfeasible from a technical and economic standpoint.

A comparison of FIGS. 8h and 8i illustrates this point. In these figures, the outer wave defense caissons 50 and 55 are drawn to the same relative scale for use at a site subjected to maximum hydrodynamic and site conditions at a maximum commercial depth. The caisson 50 is designed to substantially prevent wave over-topping, whereas the caisson 55 is designed to permit over-topping of waves which are then absorbed by an inner wave defense system (described hereinafter). In this typical example, the over-topping design of the caisson 55 has a width w approximately 60% that of the non-over-topping design of the caisson 50 and a height h approximately 70% that of the non-over-topping design, thus making the wave over-topping caisson 55 significantly more feasible to construct from a technical and economic standpoint.

Furthermore, the over-topping design of the outer wave defense caisson 55 offers other significant advantages over the non-over-topping design of the caisson 50, especially when the caissons are used under maximum hydrodynamic and site conditions and at a maximum commercial depth. These advantages include the following:

(1) The gradual slope of the main windward face 56a of the wave over-topping caisson 55 reduces the forces to be absorbed by the caisson in the face of maximum wave attack. A relatively greater proportion of these wave forces is transferred up the windward face of the caisson and over the top thereof than is the case in the wave non-over-topping caisson 50 whose main windward face 52 has a much steeper slope.

(2) The wave forces that must be absorbed by the wave over-topping caisson 55 are transferred more directly into a downward, vertical component than is the case with the wave non-over-topping caisson 50. This lessens the tendency for the caisson 55 to be lifted up and over-turned as compared to the caisson 50. When under wave attack, the wave over-topping caisson 55 experiences a significantly less increase in buoyancy as compared to that of the wave non-over-topping caisson 50.

(3) The more gradual slope of the windward face 56a of the wave over-topping caisson 55 reduces the slamming effect of maximum strength waves on the caisson when compared to the wave non-over-topping caisson 50 with its steeper windward slope 52.

(4) The optimal engineering design of the windward slope of the wave over-topping caisson 55 has two individual sloped portions 56a, 56b. The lower sloped portion 56b is at a much steeper angle relative to the upper sloped portion 56a. This allows for a greater volume and, therefore, a greater weight, of riprap to be placed on and against the windward face 56 of the wave over-topping caisson 55 as compared with the wave non-over-topping caisson 50 which has a windward face 52 of constant slope. This is illustrated in FIGS. 8j and 8k. In the case of the wave over-topping caisson 55 shown in FIG. 8k, the split-slope configuration allows approximately one-third more volume (and more weight) of riprap 30 to be placed thereon as compared to the non-split-slope configuration of an otherwise similar caisson 55x shown in FIG. 8j. The added weight of riprap 30 borne by the wave over-topping caisson 55 counteracts the lifting and turning forces.

(5) As shown in FIG. 8i, the leeward face 59 of the wave over-topping caisson 55 is perpendicular to the bed from at least the mean-low-water level to the bottom of the caisson. This allows for the juxtapositioning of a transverse support caisson (as explained hereinafter) where hydrodynamic and site conditions so dictate, whereas such is not possible in the case of the wave non-over-topping caisson 50. The provision of a transverse support caisson not only eliminates any tendency of the outer wave defense caisson 55 to shift laterally, due to the slamming action of the waves, but also adds to those countervailing forces that oppose the tendency of the caisson to be overturned.

FIG. 8e is a side elevation of a transverse support caisson 60. The caisson 60 preferably has a rectangular cross section and an annular skirt 61 to assist in holding the caisson in place by suction on the ocean floor. The caisson 60 has a vertical windward side 62 and a vertical leeward side 63 and is provided with a plurality of transverse ports 64 for permitting water to flow laterally through the caisson to dissipate wave energy and balance hydrodynamic forces on either side of the caisson. For ease of illustration, the transverse ports 64 have been shown in FIG. 8e as being rounded in shape although as site requirements dictate, they may have other shapes.

FIG. 8f shows a side elevation of an inner wave defense caisson 70. The caisson 70 has an annular skirt 71 at the bottom thereof to assist in holding the caisson on the ocean floor by suction. The windward side of the caisson 70 has a lower vertical wall portion 72 which extends from the ocean floor to above the water surface, a sloped portion 73 and an upper vertical wall portion 74. The leeward side 76 of the caisson 70 extends vertically from the top to the bottom of the caisson.

FIG. 8g shows a side elevation of a multi-purpose caisson 80. The caisson 80 has an annular skirt 81 to help hold the caisson on the ocean floor by suction. The multi-purpose caisson 80 may, for example, be similar to the storage caissons 15 and preferably has a rectangular cross section to simplify its design and construction and minimize its cost of manufacture; while at the same time, maximizing the internal volume of the multi-purpose caisson so that it may be used more effectively for the storage of materials, processing of materials, institutional purposes, administrative purposes, residential purposes and the like as described more specifically hereinafter.

Further it should be noted that the leeward face of the caissons 70 most usually would be the same height as the windward face of the caissons 80 against which they are to be placed in juxtaposition in any single integrated wave defense system.

The five primary, ballastable, trimmable caisson modules can be combined in various arrangements to construct universal, environmentally safe, wave defense systems. In a typical installation, a line of outer wave defense caissons 50 or 55 is anchored at one or both ends of the line by an anchor tower caisson 40 or 45. One or more anchor tower caissons may also be placed at intermediate points along the line of outer wave defense caissons. One or more lines of inner wave defense caissons 70 and/or multi-purpose caissons 80, as required by the hydrodynamic and underlying conditions at the selected site, are provided in juxaposition with, and on the leeward side of, the line of outer wave defense caissons. One or more transverse support caissons 60, as required by the hydrodynamic and underlying site conditions, are placed between and transverse to the lines of outer and inner wave defense caissons. The transverse support caissons together with the line or lines of inner wave defense and/or multi-purpose caissons constitute a reinforcement sub-system for the overall wave defense system. The reinforcement sub-system reinforces the line of outer wave defense caissons and prevents them from being lifted, slammed or overturned by maximum force winds and waves that may be generated at the site in question.

Figure 9:
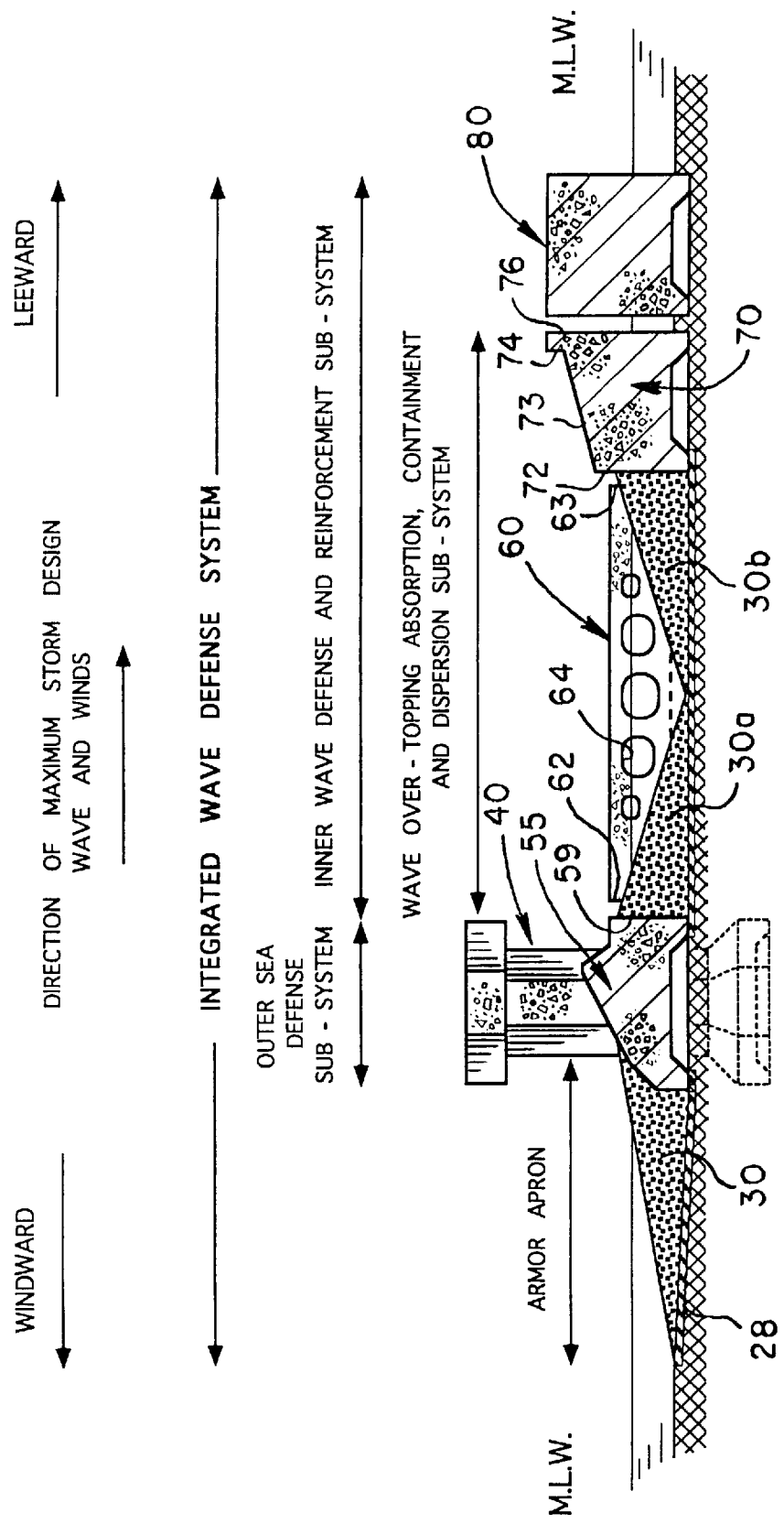
FIG. 9 is a cross-sectional view of a representative embodiment of an integrated wave defense system at a deep water site.

By way of illustration, FIG. 9 is an explanatory diagram, partly in cross section, of a typical, integrated wave defense system constructed using the modular caisson system of the invention and designed specifically for use at a location involving maximum adverse site conditions, maximum depth, and exposure to maximum hydrodynamic wave and wind conditions, such as those that can be generated by a maximum scale hurricane, typhoon or tsunami. The wave defense system comprises a line of outer wave defense caissons 55 anchored at opposite ends by anchor tower caissons 40 (only one of which is visible in the figure). As shown, the base of the anchor tower caisson 40 is embedded much deeper in the ocean floor than the other caissons. A line of inner wave defense caissons 70 extends in juxtaposition with the line of outer wave defense caissons 55 on the leeward side thereof. A line of multi-purpose caissons 80 extends along the line of inner wave defense caissons 70 on the leeward side thereof. A plurality of transverse support caissons 60 (only one of which is visible) are interposed between the lines of outer and inner wave defense caissons 55 and 70 and extend lengthwise in the transverse direction relative to the lines of outer and inner wave defense caissons. The vertical windward sides 62 of the transverse support caissons 60 confront the vertical leeward side portions 59 of the outer wave defense caissons 55, and the vertical leeward sides 63 of the caissons 60 confront the vertical windward wall portions 72 of the inner wave defense caissons 70. The vertical leeward sides 76 of the inner wave defense caissons 70 confront the vertical windward sides of the multi-purpose caissons 80.

Though not shown, means are provided for interconnecting adjoining caissons in the lines of caissons. Any suitable connection may be employed, and preferably the facing ends of adjoining caissons are provided with connectors such as interlocking connectors or other suitable means to enable connection and disconnection of adjoining caissons. Also not shown are the shock absorbing means, such as fenders, bumpers and the like, which are interposed between adjoining caissons to absorb and distribute impact forces between the caissons, and, where necessary, to prevent the passage of water between the caissons.

In designing the integrated wave defense system shown in FIG. 9, the modular caissons are selected and scaled to be no larger than necessary for the particular site. Only the minimum number and type of modular caissons are used, and the wave defense system is designed to withstand and overcome the maximum wind and wave forces that can be generated at that site. The method of constructing the wave defense system is the same as that described above with reference to FIGS. 6 and 7. All of the modular caissons are designed to be ballastable and trimmable and, to the maximum extent possible, to be manufactured in shipyard-type facilities onshore.

Maximum economic advantage is gained where the caissons can be manufactured as monolithic modules in shipyard-type facilities onshore. However, in cases where draft or other constraints prevent such monolithic manufacture, all modular caissons can be manufactured in sections by assembly of manufactured sub-assemblies or by further construction, and/or assembly of sub-assemblies, on top of a caisson base section where such further construction, and/or assembly of sub-assemblies, is undertaken at a location where adequate drafts are available and where the base elements sections act as construction "platforms" for further construction and/or assembly of sub-assemblies. For maximum economic advantage, such base sections would be manufactured at a shipyard-type facility onshore up to the maximum draft available at that facility and in the navigation channel leading from that facility to open water.

To undertake this in the most cost-effective manner, manufacturing should, to the maximum extent possible, result in components that can be floated and towed by tugs to installation assembly sites and, only when this is not feasible, should components be designed to be transported to installation sites by heavy lift vessels and/or crane ships. The objective in both instances is to maximize construction under cost-controlled conditions in shipyards or shipyard-type facilities onshore, and minimize construction offshore.

To meet this objective requires that each caisson be designed so that its construction can be broken down into discrete sections. For example, caisson bottom sections (which can act as construction platforms) and lengths of side walls and end walls, can be designed and constructed as discrete sub-assemblies. The sub-assemblies preferably have a double-wall design with internal ballast tanks therebetween, which enables the sub-assemblies to be floated and towed to installation sites.

The buoyancy required for such operations can be supplied by filling the internal ballast tanks with air and/or by attaching one or more temporary, external buoyancy enhancement devices, such as flotation "collars" or the like. Alternatively, modified-type heavy lift vessels can cradle a sub-assembly, and use of these vessels, with their greater surplus buoyancy, in effect, transfer some of the weight of the sub-assembly to themselves. For those components that cannot be floated, even with the assistance of external buoyancy enhancement devices, they should be designed and constructed so that, to the maximum extent possible, they can be carried by barges or vessels including crane ships for installation at the site.

Once manufactured, all modular caissons and/or their platforms and/or sub-assemblies are designed to be floated to the installation site, for example, by towing the caissons by a tugboat or other vessel or by placing sub-assembly parts on heavy lift vessels, crane ships, etc. At the selected site, a trench is dug by dredging, and the floor of the trench is prepared to receive the modular caissons. This may include mats 28, depending on the nature of the floor in the trench. The decision where and if to use such mats (in order to maintain the integrity of the seabed, lake bed, river bed, etc. and to assist in distributing the weight of the armor, etc.) is dependent on the soil mechanics at the site in question. For example, mats are more likely to be employed under armor, etc. where bed conditions include silts, etc. and are generally not needed where bed conditions include hard clays, etc. The modular caissons are floated into position, trimmed, and then ballasted down and sunk into place on the bed. An armor apron 30 of varying size rock, concrete block and riprap is placed, as needed, on and against the sides of the modular caissons to provide for a first line of wave energy absorption, add necessary mass to the overall wave defense system, and eliminate scouring around the wave defense system. Depending on the severity of the hydrodynamic conditions at the site in question, additional armor aprons 30*a* and 30*b* may be needed.

The integrated wave defense system is constructed such that at the end of the useful life thereof, the modular caissons can all be disassembled, where necessary, ballasted up and towed away, either for reuse at another site or for destruction, thereby leaving the site as nearly as possible in its pre-construction state. Any residual underwater mounds of rock or concrete armor can be re-shaped to provide fishing reefs. The wave defense system can thus be de-mounted and removed at relatively low cost and without leaving any significant permanent environmental change.

FIG. 9 illustrates an inner wave defense and reinforcement sub-system for reinforcing the line of outer wave defense caissons 55. The sub-system comprises the transverse support caissons 60, the line of inner wave defense caissons 70 and the line of multi-purpose caissons 80. The reinforcement sub-system reinforces and supports the line of outer wave defense caissons 55 and prevents them from being lifted, slammed or overturned by maximum force wind and waves. Depending on the maximum adverse site conditions, it may be necessary to place a transverse support caisson 60 behind each one of the outer wave defense caissons 55, though that number of transverse support caissons would not normally be required, especially if the line of outer wave defense caissons 55 is curved or angled outwardly in the direction of the prevailing winds and waves. For example, if the outer wave defense caissons are deployed in a straight line, as might be the case in coastal protection systems, a transverse support caisson would likely be placed behind each outer wave defense caisson or, if not, some other caisson interlocking mechanism would have to be employed. On the other hand, if the outer wave defense caissons are deployed in a curved line, especially in an arch configuration, transverse support caissons may not be needed behind each outer wave defense caisson and placement behind intermediate ones may suffice.

Under the maximum adverse site conditions, maximum water depth and maximum hydrodynamic wave and wind conditions considered for the wave defense system shown in FIG. 9, a major problem is created due to the energy potential of waves over-topping the line of outer wave defense caissons 55. If the line of outer sea defense caissons 55 is built to entirely eliminate the possibility of wave over-topping, the resulting structure would be so massive as to be impractical from engineering and cost standpoints. In accordance with the present invention, this problem has been solved by designing the line of outer wave defense caissons 55 to accept a significant amount of wave over-topping and by providing a uniquely designed wave over-topping absorption, containment and dispersion subsystem within the reinforcement sub-system. Such a subsystem must be designed as an integral part of the reinforcement sub-system which, in turn, must be designed as an integral part of the overall wave defense system.

The wave over-topping absorption, containment and dispersion sub-system comprises two of the five primary modular caissons, namely, the transverse support caissons 60 and the inner wave defense caissons 70. From a structural point of view, the inner wave defense caisson 70 is almost as massive as the multi-purpose caisson 80 but differs therefrom in significant respects. Namely, the inner wave defense caisson 70 has an extensive sloping windward face 73, and perpendicular walls 72 and 74 above and below the sloping face 73. The two walls 72,74 create wave-slamming surfaces that serve to create counter waves that contribute their energy towards breaking up the incoming over-topping waves. The extensive windward facing slope 73 serves to cause any residual surge of water up the slope, known as "uprush", to lose energy and fall back, known as "downrush", onto the incoming over-topping waves.

The transverse support caissons 60 have a relatively low profile and have large transverse holes 64 extending therethrough. For ease of illustration, these holes are shown to be elliptical although other shapes may be required under other circumstances, such as where riprap 30*a* and/or 30*b* is required. These features allow for greater lateral dispersion of any build-up of water levels resulting from waves over-topping the line of outer wave defense caissons 55, and falling back as "downrush" from the line of inner wave defense caissons 70. In this manner, the inner wave defense caissons 70 and the transverse support caissons 60 jointly constitute the wave over-topping absorption, containment and dispersion subsystem, which must be included in the overall wave defense system when the hydrodynamic, wind and site conditions are such as to require a maximum scale integrated, overall wave defense system.

The scale of the modular caissons to be used at a particular site is a function of the maximum hydrodynamic and wind forces that are expected to be generated at that site. These forces are largely a function of the height and velocity of the maximum strength waves and the maximum wind pressure that are expected to be generated at that site. In theoretical terms, the energy generated by a wave is given by the equation:

$E = \frac{1}{8} (\rho g H^2)$ where E=wave energy in joules per square meter ($Jm^{-2}$)
$\rho$=density of water in $Kgm^{-3}$
g=9.8 $ms^{-2}$
H=wave height in meters In actual practice, the height of the maximum wave, and its maximum speed, for the purposes of calculating the scale of the modular caissons can only be derived when site specific data are known.

In large bodies of water, the engineering forces generated by maximum force winds and waves can vary greatly, depending on the location of the particular site under consideration. For example:

(1) A group of waves, such as generated by a hurricane, can be more damaging to a wave defense system than a single, very high wave, such as generated by a tsunami.

(2) An irregular train of waves can be more destructive than a regular train of waves.

(3) Breaking waves can exert much greater pressures than non-breaking waves.

In addition, the extent to which wave-generated forces can vary at different locations, especially near coastlines or shorelines, is further compounded by the fact that the bottom usually slopes upward as the waves approach the coastlines or shorelines, thereby increasing bottom friction ("bottom effect") which, in turn, tends to reduce wave height. On the other hand, depending on the degree of rise of the bottom slope as it approaches the coastline or shoreline, the shoaling effect can increase wave height and may also contribute to the creation of breaking waves.

This complexity of forces that can be generated by waves, especially as they approach coastlines or shorelines, must be taken into account in the engineering layout and design of wave defense systems. In view thereof, the necessary calculations to properly scale the modular caissons requires an interactive methodology between, on the one hand, ocean engineering calculations and geophysical site studies and data, and on the other hand, the results of accurately scaled physical hydrodynamic model tests (hydraulic model tests) in properly calibrated hydrodynamic test tanks (wave basins and wave flumes) where actual site conditions can be simulated. Hydrodynamic (hydraulic) model tests are essential if the engineering design of any wave defense system is to proceed on a sound basis.

Test models are usually constructed to a linear scale of 1:100 to 1:150 (model to prototype). Models are designed and model tests operated in accordance with Froude's model laws. Models are constructed of concrete on a wave basin floor, usually inside a large hangar or shed, which protects against wind, rain, snow, etc. The wave basins have to be extremely well lighted to assure that sharp photographs can be taken of wave patterns and the like. Waves are reproduced to scale by a wave-making machine. Wave heights are typically measured by electric gauges. The impact and effects of maximum strength waves on a wave defense system will be felt (by reflected waves) over a considerable distance surrounding the system. It is essential that the impact and effects over this entire area are accurately measured. For this reason, the size of the wave basin must be many times larger than the models being tested. For example, a model of a large wave defense system might require a wave basin as large as a football field.

It is as a result of long-term evaluation of the wide range of forces that can be generated over large bodies of water, that a solution involving the use of five primary, ballastable, trimmable, modular caissons has been developed.

The overriding importance of considering site specific data and hydrodynamic tank testing in determining the proper scaling of the modular caissons cannot be overemphasized. The complexity surrounding the theoretical calculations in determining proper scaling, and the absolute essentiality of undertaking these calculations in an interactive manner together with the results from site specific hydrodynamic tank tests, can be readily appreciated from a review of the site specific variables involved. The maximum wave and wind forces at a particular site are a function of a number of variables, including:

(1) The fetch, or distance, over which maximum force winds and waves can travel unobstructed before they reach the site.

(2) The velocity of the wind blowing over this fetch.

(3) The duration over which this wind blows.

(4) The maximum depth of water at the site, taking into account maximum tide and storm surge levels.

(5) The degree of rise, or slope, of the seabed, lake bed, etc. as it approaches the site, especially from the directions of maximum wind and wave attack.

(6) The velocity and direction of the currents around the site.

(7) The extent of the scour effect around the site.

High velocity winds, blowing over a long fetch for an extended period of time, create powerful waves. As these waves approach a coast, especially if, at the same time, there is also a steep rise in the bed surrounding the site, the waves can generate enormous destructive power. An example of this power can be seen when waves of only 30 feet in height, but propelled by hurricane force winds, broke up the tanker Brea when it was wrecked on the coast of the Shetland Islands in January 1993. It is not unusual, however, for the maximum wave height around the Shetland Islands to reach twice, or more than twice, this level.

For a wave defense system to be truly universal, consideration must also be given to tsunamis and the extreme wave conditions they represent. For example, in 1992, two large-scale tsunamis came ashore on Pacific coastlines; one in Nicaragua and one in Indonesia. In both cases, these tsunamis, created by major underwater earthquake and/or volcanic events, resulted in waves reported to be over 60 feet high hitting the coasts with widespread loss of life and destruction. The wave defense system of the present invention is the only known modular caisson system in the world that can be scaled up to the size necessary to withstand full-scale tsunamis such as those experienced in the Pacific in 1992.

It is this maximum hydrodynamic condition that dictates the scaling of the modular caissons and the final engineering calculations used in the design of a wave defense system for a particular site. Failure to understand and design against maximum level forces can lead to disastrous results.

For example, it was because of miscalculation, and a misunderstanding, of both the scale and the direction of the maximum wind and wave forces that could be generated at Signes, Portugal that led to the destruction of the 100 foot deep breakwater at this site in its first Atlantic storm. In fact, it was only after Dutch ocean engineers were able to simulate the actual destruction of the Signes breakwater in a wave flume test series that proper calculations could then be started, leading to the reconstruction of the breakwater.

From the standpoint of cost, the depth of water at a selected site is important, because the cost of construction of a wave defense system using the modular caissons tends to increase as a square of the height of the maximum wave that can be generated at that site. For any implementation of the modular caisson system in large, open bodies of water to be commercially viable, the site depth should be kept to a minimum, generally no greater than the depth (at mean low water) necessary to accommodate the private sector and/or public sector uses at that site. For example, if the primary use of the wave defense system is to create a protected harbor for general cargo vessels, then the navigation depth of water required at mean low water (M.L.W.), including clearance under the keel, is currently about 45 feet. On the other hand, if the primary use is to create a harbor for maximum-size bulk carriers, then the navigation depth is currently about 80 feet (M.L.W.). Of course, a wave defense system must be designed to provide protection above this navigation depth to account for tidal change and storm surge. By contrast, a wave defense system having as its primary use coastal protection against beach erosion could be located in depths as little as 20 feet (M.L.W.) or even less depending on site conditions.

The commercial depth range for ocean-going vessels, which includes maximum tide and storm surge conditions in addition to maximum navigation depth requirements, currently lies between 20–100 feet for the vast majority of the world's ports. Technically, however, it is possible to consider constructing wave defense systems using the five primary, ballastable, modular caissons in even deeper waters, outside this commercial depth range. The construction of wave defense systems in shallower, relatively protected, waters, such as bays, estuaries, rivers, lakes and the like is discussed later. Even though the current extremes of the commecial depth range for ocean-going vessels probably differ by no more than 70–80 feet, the maximum force waves and winds that can be generated within this depth difference can vary greatly. As a result, the configuration and cost of construction of a wave defense system located in large, open bodies of water can also vary greatly within such a relatively small vertical distance.

The five primary, ballastable, standardized modules have been developed to encompass the full range of private and/or public sector uses for wave defense systems, constructed using the modular caissons, taking into account the site specific variables described previously. General engineering designs have been developed for each of three, typical, integrated wave defense systems at sites located in large, open bodies of water experiencing different site specific conditions. FIGS. 10–12 are drawn to relative scale and show the layouts of these systems.

FIG. 10 shows a wave defense system developed for a site located in a large, open body of water and experiencing minimum fetch, wind velocity, duration, tide, surge, rise, currents and scour effect at minimum commercial depth (case A). FIG. 11 shows a wave defense system developed for a site located in a large, open body of water and experiencing intermediate level fetch, wind velocity, duration, tide, surge, rise, currents and scour effect at an intermediate commecial depth (case B). FIG. 12 shows an integrated wave defense system developed for a site located in a large, open body of water and experiencing maximum fetch, wind velocity, duration, tide, surge, rise, currents and scour effect at a maximum commercial depth (case C). The modular caissons in each of the wave defense systems shown in FIGS. 10, 11 and 12 are drawn to the same relative scale. It is obvious that the increase in scale between the three wave defense systems of cases A, B and C is not a linear function; instead, it is closer to being an exponential function. A comparison of the scale of these three cases shows the construction cost "penalty" that must be paid for going into deeper waters, especially at a site that is also exposed to maximum wind and wave forces, such as would be the case where a maximum scale hurricane, etc. causes breaking waves at the site in question.

One of the major factors causing this exponential increase in scale is due to the so-called "bottom effect." In shallow waters, there is known a phenomenon that results in waves at shallower depths, such as in case A, being affected to a relatively greater extent by the "drag" or "bottom effect" exerted on the waves by the proximity of the bed (seabed, lake bed, etc.). Conversely, as the depth of water increases, the relative effect of this "drag" decreases. As a result, if all other variables are equal, and depending on where the countervailing shoaling effect occurs, the storm design wave at the deeper site, such as in case C, can be exponentially larger than the storm design wave at the shallower site (case A). This, in turn, means that the lifting, slamming and overturning forces on the outer wave defense caissons and the anchor tower caissons generated by the larger storm design wave at the deeper site can be exponentially larger than those generated by the smaller storm design wave at the shallower site. This phenomenon, together with the increased forces generated by the greater fetch, wind velocity, duration, rise, tide, storm surge and scour assumed for the deeper case C site, explain why the scale of the wave defense system in case C has to be so much greater than in case A.

The general engineering design and layout of the differently scaled wave defense systems for cases A, B and C are shown in FIGS. 10, 11 and 12. Specifically, the general engineering design and layout for the five primary, ballastable, modular caissons to form single, integrated wave defense systems in large, open bodies of water have been established for each of the three cases, and such covers the general design and layout required for any wave defense system within, as well as outside, the full range of commercial depths.

As noted earlier, in actual practice, such general engineering designs and layouts must be modified to take into account the results of site-specific geophysical studies and subsequent hydrodynamic model testing and further ocean and civil engineering calculations.

FIG. 10a is a cross-sectional side elevation of an integrated wave defense system at a site experiencing minimum conditions of fetch, wind velocity, duration, tide, surge, rise and scour effect and located at a minimum commercial depth (case A), and FIG. 10b is a top plan view of the wave defense system. In case A, it was found that a single, integrated wave defense system could be provided using only a line of outer wave defense caissons 50a and anchor tower caissons 40a at the opposite ends of the line of caissons 50a. Under this set of minimum conditions, it was found that neither a line of inner wave defense caissons nor provision of transverse support caissons were needed in order to provide the degree of wave defense required at such a site. It should be noted that a site located in large, open bodies of water that meets this set of minimum criteria, while not impossible to find, will almost certainly not be the norm.

For purposes of establishing a common scale to allow comparison between FIGS. 10, 11 and 12, an LNG bulk carrier 91 is shown in each figure. In FIG. 10, the LNG bulk carrier 91 is shown alongside a line of multi-purpose caissons 80a. Alternatively, quay/dock caissons 90 can be used in place of, or, as shown in FIGS. 11 and 12, in addition to the multi-purpose a. The quay/dock caisson 90a does not constitute one of the standardized, primary modular caissons which make up the modular caisson system of the invention, but rather is a secondary caisson for use as a quay or dock. The quay/dock caisson 90 provides no structural support in the wave defense system and may be replaced by any other suitable structure.

FIG. 11a is a cross-sectional side elevation of a wave defense system constructed of primary modular caissons at a site located in a large, open body of water experiencing intermediate fetch, wind velocity, duration, tide, surge, rise and scour effect conditions and located at an intermediate commercial depth (case B), and FIG. 11b is a top plan view of the wave defense system.

In case B, it was found that, as a result of the significant forces generated by residual waves over-topping the line of outer wave defense caissons 55b, an additional line of inner wave defense caissons had to be provided. For this purpose, a line of multi-purpose caissons 80b is provided on the leeward side of the outer wave defense caissons 55b, the outer and inner lines of wave defense caissons extending in juxtaposition to one another.

In addition, in case B, it was found that the extent of the lifting, slamming and overturning forces on the outer wave defense caissons 55b required further support. For this purpose, the transverse support caissons 60*b* are placed between and transversely to the lines of outer and inner wave defense caissons 55*b* and 80*b*. The transverse support caissons 60*b* together with the line of multi-purpose caissons 80*b* constitute a reinforcement subsystem which effectively reinforces the line of outer wave defense caissons 55*b*.

In this installation, the outer wave defense caissons 55*b*, transverse support caissons 60*b* and multi-purpose caissons 80*b* together with the anchor tower caissons 40*b* constitute and act as one integrated wave defense system under the intermediate conditions assumed for case B sites. A line of quay/dock caissons 90*b* extends along the leeward side of the line of multi-purpose caissons 80*b*, and the LNG bulk carrier 91 is shown for purposes of establishing a common scale to allow comparison between the wave defense systems for cases A, B and C.

FIG. 12*a* is a cross-sectional side elevation of a wave defense system using primary modular caissons designed for a site located in a large, open body of water and experiencing maximum fetch, wind velocity, duration, tide, surge, rise and scour effect and located at a maximum commercial depth (case C), and FIG. 12*b* is a top plan view of the sea defense system.

Case C is designed to withstand the maximum level of wind and wave forces that can be generated as well as the maximum lifting, slamming and overturning forces and levels of wave over-topping that can occur under such maximum conditions. In case C, it was found that the scale of the anchor tower caissons and wave defense caissons used in case B had to be significantly increased and, in addition, the line of multi-purpose caissons had to be further reinforced by a second line of inner wave defense caissons 70*c*. The combination of the transverse support caissons 60*c*, with their lower profile and transverse ports 64*c*, and the inner wave defense caissons 70*c*, with their wave-slamming walls and sloping windward face, constitute a wave over-topping absorption, containment and dispersion sub-system for effectively dispersing the waves overtopping the outer line of wave defense caissons 55*c*.

The up-scaling of the case C wave defense system is necessary in order to bring the overall mass of the integrated wave defense system up to the level needed to be able to withstand the maximum force winds and waves that can be expected at this deepest of commercial sites under consideration. This site would be subjected to the full force of maximum scale hurricane, typhoon or cyclone winds and waves and/or tsunamis, notably waves that are traveling over the longest fetch and are propelled by the strongest possible winds blowing for the longest possible duration, and are approaching the wave defense system up a relatively steep rise.

As noted previously, it was a failure to understand, and design against, the scale of such maximum level forces that led to the destruction of the 100 foot deep breakwater at Signes, Portugal during its first major Atlantic storm.

The description so far has focused mainly on wave defense systems for location at sites in deeper waters, such as along coastlines or offshore. The modularity of the wave defense systems, and their flexibility for scaling assembly into different configurations, allows them to be readily scaled down and used in shallower waters, such as in gulfs, bays, estuaries, rivers, lakes and the like. In addition, the wave defense systems are designed to be used just as effectively in saltwater environments as in either brackish or freshwater environments.

FIGS. 13*a*, 13*b* and 13*c* are cross-sectional elevational views, drawn to the same scale, of typical integrated wave defense systems under varying hydrodynamic and site conditions and located in relatively shallow, protected waters, such as in gulfs, bays, estuaries, rivers, lakes, etc. The wave defense systems shown in FIG. 13 are typical examples of systems that could be used to provide secure harbors for relatively shallow draft vessels, such as coasters, barges, and river and harbor traffic. On the other hand, the wave defense systems shown in FIGS. 10, 11 and 12 are typical examples of systems that could be used to provide secure harbors for deep draft vessels, such as ocean-going vessels.

The same methodology was used in the calculations determining the design of the systems in FIG. 13 as was used in the design of the systems in FIGS. 10, 11 and 12. The calculations and resulting designs were developed in each case under three sets of varying hydrodynamic and site conditions: minimum, intermediate and maximum.

The primary difference between the deeper water configurations shown in FIGS. 10, 11 and 12 and the shallower water configurations shown in FIG. 13 is that, in the shallower waters, the transverse support caissons 60 and the inner wave defense caissons 70 and 75 are much less likely to be needed, if at all. Most integrated wave defense systems for use in shallower, more protected, waters can be constructed using just ballastable, anchor tower caissons, outer wave defense caissons and multi-purpose caissons scaled to appropriate size. It is also probable that the anchor tower caissons used in shallower waters will be the truncated anchor tower caissons 45 rather than the taller anchor tower caissons 40, and that the outer wave defense caissons 50 will most usually be used rather than the outer wave defense caissons 55 (which are more likely to be used in deeper waters).

FIG. 13*a* is a cross-sectional side elevation of an integrated wave defense system at a site experiencing minimum site conditions and located at a minimum commercial depth (case D), such as would be encountered by river and harbor traffic, barges, etc. In such shallower, more protected, waters under minimum site conditions, the wave defense system could be provided using only a line of multi-purpose caissons 80*d*. For purposes of establishing a common scale to allow comparison between FIGS. 13*a*, 13*b* and 13*c*, a barge 92 is shown alongside the multi-purpose caissons 80*d*, 80*e* and 80*f*.

FIG. 13*b* is a cross-sectional side elevation of an integrated wave defense system constructed at a site experiencing intermediate site conditions and located at an intermediate commercial depth (case E), such as would likely be encountered by coastal vessels, river and harbor traffic, barges, etc. This wave defense system comprises a line of outer wave defense caissons 50*e* anchored at either end by truncated anchor tower caissons 45*e*. On the leeward side of the outer line of wave defense caissons and in juxtaposition therewith is an inner line of multi-purpose caissons 80*e*. Again, for comparison purposes, the barge 92 is shown alongside the caissons 80*e*.

FIG. 13*c* is a cross-sectional side elevation of an integrated wave defense system located at a site experiencing maximum site conditions and at a maximum commercial depth (case F), such as would be encountered by larger coastal vessels, as well as river and harbor traffic, barges, etc. In case F, an outer line of outer wave defense caissons 50*f* is anchored at either end by taller anchor tower caissons 40*f*, rather than the trucated tower caissons 45*e* used in case B. An inner line of multi-purpose caissons 80*f* is provided in juxtaposition with the outer line of wave defense caissons 50*f*, and a line of quay/dock caissons 90*f* is placed along the multi-purpose caissons 80*f*.

Figure 14:
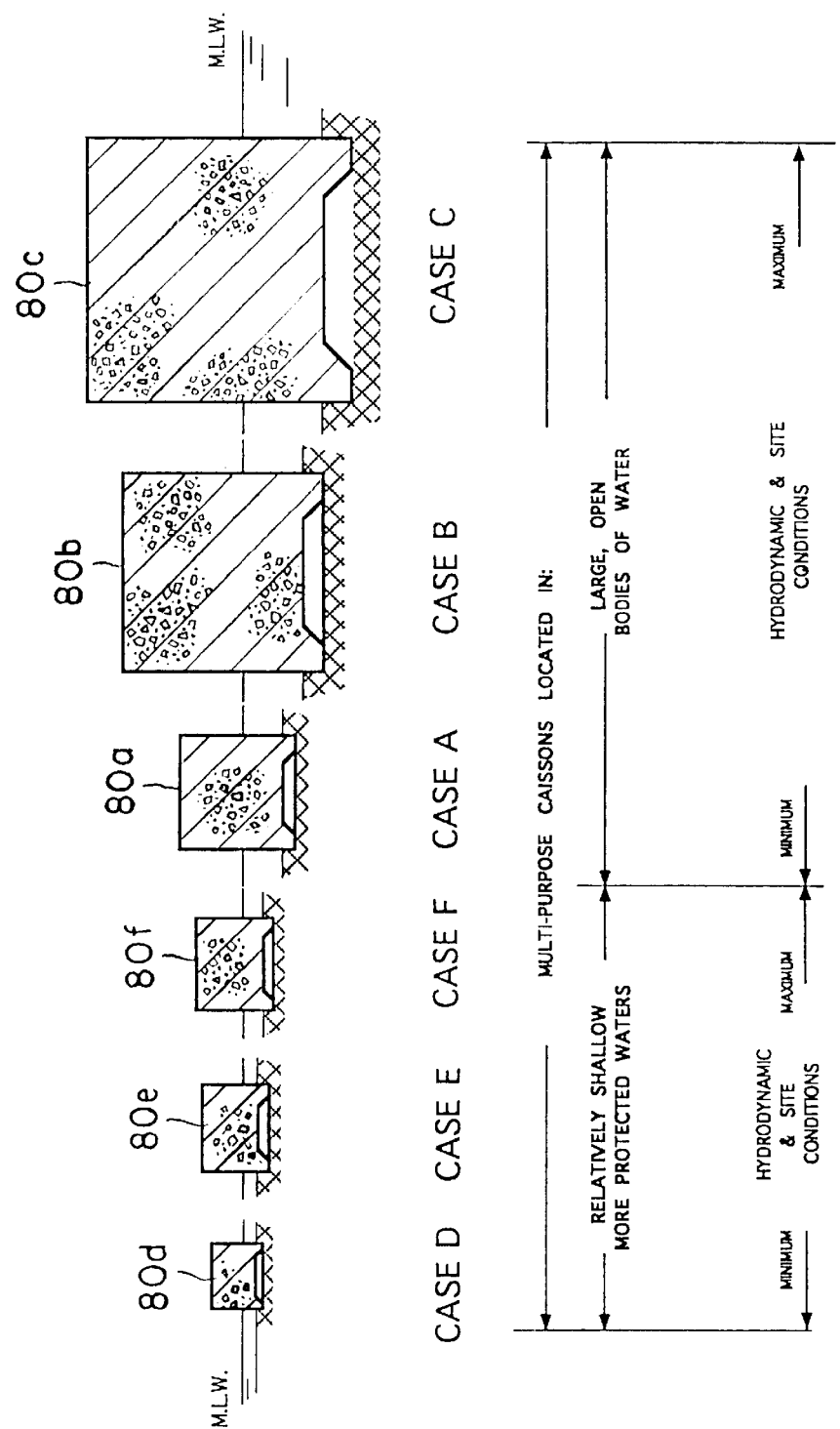
FIG. 14 shows cross-sectional side elevations, at the same scale, of one type of standardized, ballastable modular caisson showing the size variation thereof across the full range of hydrodynamic and site conditions.

To illustrate the versatility and full range of scaling of the modular caissons, reference is made to FIG. 14. FIG. 14 shows the full range of scaling for one type of ballastable caisson, in this case, the multi-purpose caisson 80. FIG. 14 shows the scale of these caissons from maximum use in large, open, deeper bodies of water, such as along coastlines or offshore in the ocean, to minimum use in shallower, more protected waters, such as in bays, estuaries, rivers or lakes.

The cross-sectional side elevations shown in FIG. 14 are all drawn to the same scale and are based on the full range of hydrodynamic and site conditions, including fetch, wind velocity, duration, tide, surge, rise, currents and scour effect. FIG. 14 clearly demonstrates the exponential effect of moving wave defense systems out from shallow, protected waters to deeper, offshore waters in the open ocean, especially systems exposed to maximum hydrodynamic and site conditions.

In designing any wave defense system using sunken caisson technology, careful attention must be given to the possibility of the caissons being toppled over by maximum strength waves, which create large scale lifting and slamming forces and turning moments. There are two basic design considerations, unique to sunken caisson technology, which address this problem—namely, the toppling factor and the penetration factor. These will be described with reference to FIGS. 15 and 16.

The toppling factor is a measure of the capability of a wave defense system to resist toppling or turning over, i.e., a resistance to toppling or overturning. The larger the toppling factor, the more likely a wave defense system is to topple when subjected to maximum wave and wind attack and thus the lower the stability of the overall wave defense system. The penetration factor is a measure of the depth of penetration of the caissons, particularly the anchor tower caissons, into the seabed, lake bed, etc., and is a function of the stability of the overall wave defense system. The larger the penetration factor, the less likely a caisson is to be displaced or dislodged when subjected to maximum wave and wind attack and thus the greater the stability of the overall wave defense system.

The toppling and penetration factors are useful as preliminary design considerations in designing the first model of the wave defense system. As described below, these factors are used initially to select the configuration of the caissons for building test models, approximate the caisson model scale, etc. In the examples depicted in FIGS. 15 and 16, representative values have been chosen for an initial design of a typical wave defense system designed for use against maximum scale wave and wind attack under maximum site conditions.

The toppling factor T of a wave defense system is defined as the ratio of the average height $h_{AV}$ of the wave defense system at a given cross section to the maximum width $w_{MAX}$ of the wave defense system at that cross section, i.e., $T=h_{AV}/w_{MAX}$, and is a measure of the relative likelihood of a sunken wave defense system being toppled (i.e., being lifted up, overturned and swept away) when under maximum scale wave and wind attack. The calculation of an absolute toppling factor for a wave defense system is quite complex. It is, however, useful to show in general terms, with reference to FIG. 15, a typical example of how a toppling factor can be calculated according to the principles of the present invention.

First, a determination is made as to the depth ($D_1$) at mean low water at the desired site.

Second, a determination is made as to the maximum depth ($D_2$) of water at the desired site, i.e., $D_1$+maximum tide+maximum storm surge.

Third, a determination is made as to the height (h) of the maximum design wave just before it arrives at the wave defense system, taking into account the variables described hereinabove for determining maximum wave and wind forces at the desired site. In the typical example shown in FIG. 15, h is taken to be $0.8(\pm)\times D_2$.

Fourth, a determination is made of the height ($h_1$) above the seabed, lake bed, etc. of the breaking crest of this maximum design wave for which the wave defense system is designed, again at a point just before it arrives at the wave defense system. In the typical example shown in FIG. 15, $h_1$ is taken to be $\frac{1}{2}\times h+D_2$.

Fifth, a determination is made, depending on the uses to which the wave defense system is to be put, as to whether to allow significant wave over-topping or no wave over-topping. Based on this determination, the maximum height $h_2$ of the inner wave defense caissons and/or the multi-purpose caissons in the system is determined as a function of the maximum height $h_1$. Namely, if significant wave over-topping is to be allowed, then the maximum height $h_2$ is set close to the value of $h_1$, i.e., $h_2=1.0(\pm)\times h_1$. If no wave over-topping is to be allowed, then the maximum height $h_2$ is set close to twice the value of $h_1$, i.e., $h_2=2.0(\pm)\times h_1$. The system shown in FIG. 15 is designed to allow essentially no wave over-topping and is based on the relation $h_2=1.8\times h_1$. A multiplier other than 1.8 can be used, and the value of the multiplier is typically determined based on a first approximation of the amount of wave over-topping to be allowed by the system. In this manner, the maximum height $h_2$ of the highest and most leeward caissons in the system (typically the inner wave defense caissons and/or the multi-purpose caissons) can be determined.

Sixth, knowing the maximum height $h_2$ of the highest and most leeward caissons in the system, and following the general engineering design and layout principles described hereinabove, it is possible to undertake the preliminary cross-sectional design of the wave defense system.

Seventh, knowing the preliminary cross section of the wave defense system allows for a determination of the average height $h_{AV}$ of the cross section and the maximum width $w_{MAX}$ of the cross section.

Eighth, the initial toppling factor T of the wave defense system is determined by calculating the ratio $h_{AV}/w_{MAX}$. The initial toppling factor T for the wave defense system shown in FIG. 15 is calculated as $T=h_{AV}/w_{MAX}=0.068(\pm)$.

The analysis of similar initial calculations of toppling factors for various configurations of wave defense systems suggests that a toppling factor of less than about 0.14, and in particular less than about 0.07, is indicative of a wave defense system that will have little or no tendency to be toppled under maximum wave and wind attack, and even less tendency to be toppled if the penetration factor for the anchor tower caissons in the system also falls within preferred limits as described below.

The penetration factor P of an anchor tower caisson is defined as the ratio of the depth of penetration p of the anchor tower caisson into the bed to the overall height h of the anchor tower caisson, i.e., $P=p/h$, and is a measure of relative anchorability of the wave defense system. As in the case of the toppling factor, the calculation of an absolute penetration factor for a wave defense system is extremely complex. It is, however, useful to show in general terms, with reference to FIG. 16, typical example of how a penetration factor for the anchor tower caissons can be calculated in accordance with the principles of the present invention.

First, a determination is made of whether the initial penetration factor for the anchor tower caissons in the wave defense system should be closer to a maximum level or closer to a minimum level. This determination is based on an initial evaluation of the sub-surface conditions of the intended installation site. Most wave defense sytems are likely to be located near or at existing densely populated areas along coastlines or shorelines, and most of these existing coastal population centers tend to be located where the sub-bed conditions often tend towards "soft" materials, such as silts, soft clays, silt/sand mixes, etc. and do not as often tend towards "hard" materials, such as hard clays, etc. It is obvious that the relative penetration of an anchor tower caisson into the bed at a soft site needs to be greater than at a hard site in order for the wave defense systems to have the same relative stability.

Second, a determination is made of the initial amount of penetration p that the anchor tower caissons should have, taking into account sub-bed conditions and soil mechanics calculations, and the overall height h of the anchor tower caissons.

Third, the initial penetration factor P for the anchor tower caissons is determined by calculating the ratio p/h.

Figure 16B:
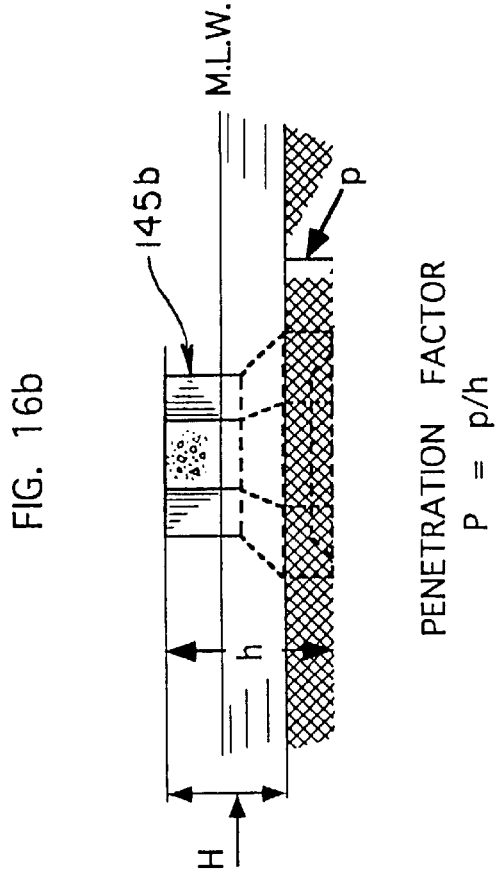
FIGS. 16a–16b are explanatory side views of two anchor tower caissons of different heights for use in explaining the penetration factor.
Figure 16A:
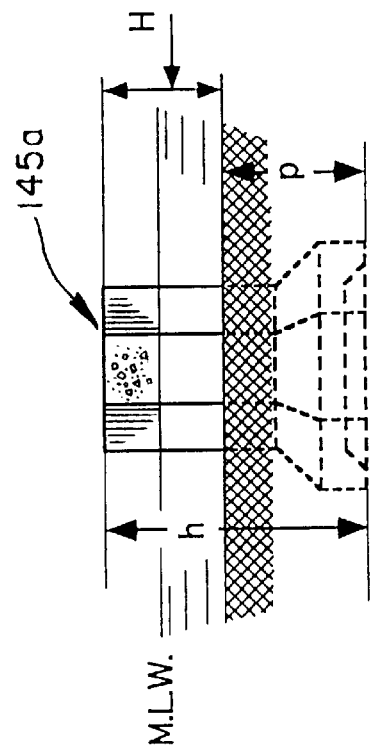

FIGS. 16a and 16b are explanatory side elevations of two truncated anchor tower caissons of signficantly different overall height h, both embedded in relatively "soft" bed materials. FIG. 16a shows an anchor tower caisson 145a of greater relative height h and embedded to a greater relative depth into the bed than the anchor tower caisson 145b shown in FIG. 16b. It should be noted, however, that the heights H of both anchor tower caissons above the bed is the same in each case. The initial penetration factor P for the anchor tower caisson 145a is calculated as P=p/h=0.54($\pm$) and that of the anchor tower caisson 145b is calculated as P=p/h 0.27($\pm$).

The calculation of the initial penetration factor in each case gives a preliminary indication, for the engineering design and layout of the overall wave defense system, of the "anchorability" of that system provided by its anchor tower caissons.

All other things being equal (including bed and site conditions, wave and wind forces, etc.), the anchor tower caisson 145a with a penetration factor P=0.54($\pm$) shown in FIG. 16a would have a significantly higher wave defense system anchoring capability than would the anchor tower caisson 145b having a penetration factor P=0.27($\pm$) shown in FIG. 16b.

The analysis of similar initial calculations for various wave defense system configurations suggests that for a wave defense system subjected to maximum wave and wind conditions and maximum "worst case" site conditions, including silt type sub-bed soil conditions, the anchor tower caissons anchoring the system should have a penetration factor P ranging between 0.60($\pm$) and 0.30($\pm$) and, within this range, the higher the penetration factor the better the anchorability.

In summary, the deeper penetration of the anchor tower caissons has, as one of its main objectives, the purpose of limiting to the maximum extent possible, any lateral (sideways) movement of the caissons in the wave defense system. This contrasts to the reinforcement sub-system (of transverse support, inner wave defense and multi-purpose caissons) which has, as one of its main objectives, the purpose of limiting, to the maximum extent possible, any backward movement of the wave defense system, as a whole, when under maximum wave and wind attack.

A wave defense system according to the present invention is designed with the objectives that:

(1) The anchor tower caissons remain in a fixed position, thus limiting any lateral (sideways) movement of the wave defense caissons in the overall wave defense system to no greater extent than the compression capability of the energy absorption fenders, shock absorbers, etc. placed between the individual caissons laterally along the length of the wave defense system.

(2) With the anchor tower caissons fixed and only minor lateral movement in the wave defense caissons possible, the reinforcement sub-system (of transverse support inner wave defense and multi-purpose caissons), due, in large part, to the partially sunken positions of the caissons in the bed, is able to limit any backward movement of the wave defense caissons and of the overall wave defense system to no greater extent than the compression capability of the energy absorption fenders, shock absorbers, etc. placed between the individual caissons across the width of the system from windward to leeward.

As a result, any overall wave defense system, constructed using the principles of the present invention, will remain stale at any site even when subjected to maximum adverse hydrodynamic and site conditions.

It should be stressed that the initial toppling and penetration factors should be treated as relative rather than absolute ratios, having as their main initial uses to assist in the selection of the wave defense system configuration and to reduce the cost of model construction. To assist in the selection process between different sunken caisson wave defense systems that may be candidates for the same site, it is often useful in determining which system to use, especially when all alternative systems are extremely complex, by having a preliminary set of comparative data. After selection of the wave defense system configuration, the determination of the first set of caisson dimensions and the first configuration of caisson modules can be made so that models can be scaled and constructed for use in the hydrodynamic (hydraulic) tank tests. Since the construction of models for such tests is costly, anything that can be done to bring the first set of models as close as possible to final can save a great deal of time and money.

The present invention enables construction of wave defense systems comprised of ballastable, trimmable, modular caissons that can be constructed to a maximum extent under cost-controlled conditions in shipyards or shipyard-type facilities; floated, and then towed out to installation sites; assembled, precisely trimmed and then ballasted down, to form the optimal, single, integrated wave defense system needed for the site in question; and removed, if ever necessary, by being disassembled, ballasted up and towed away. The wave defense systems can be constructed from a limited number of standardized, ballastable, modular caissons, which can be scaled up or scaled down to provide wave defense systems capable of withstanding and overcoming the strongest possible wind and wave conditions, including maximum strength hurricanes, typhoons and tsunamis, and the severest possible adverse hydrodynamic, wind and site conditions including maximum fetch, wind velocity and duration, depth, rise, tidal range, storm surge, currents and scouring.

The ballastable, trimmable, modular caissons can be assembled into a reinforcement sub-system comprised of transverse support caissons and one or more lines of inner wave defense caissons for reinforcing a line of outer wave defense caissons. The modular caissons can also be assembled to form a wave over-topping absorption, containment and dispersion sub-system comprised of inner wave defense caissons and transverse support caissons, for absorbing, containing and dispersing wave energy caused by over-topping. Both sub-systems can be integrated in an overall wave defense system to prevent any residual wave over-topping from reaching the protected area on the lee side of the overall wave defense system and to fully protect this area from the strongest possible winds thus allowing the area to be used for vessels maneuvering at slow speed, docking or anchored, especially those vessels having a relatively high "windage" profile, such as tankers and bulk carriers, car carriers, cruise ships, liquified gas carriers, etc. which together currently represent the largest proportion of all vessels engaged in world trade.

The wave defense systems constructed of modular caissons according to the present invention can withstand those wind and wave conditions which actually exist in most locations throughout the world, along coastlines and in deeper, large open bodies of water, including the open ocean. Such locations are much more likely to face the maximum, and severest, wind and wave conditions rather than the less severe conditions faced by locations in shallower, more protected, waters. The unique modular design of the five, primary caissons can be scaled up or down to meet the wind and wave protection requirements, and site requirements, at the location in question, and only those types of modulues need be used that are essential to meeting the hydrodynamic, wind and site conditions at the selected location.

The integrated wave defense system is entirely environmentally safe and can, due to its modular construction, be removed at the end of its useful life so that the site can be returned to its pre-construction state from an environmental standpoint. Because the modular caissons are ballastable, they can be ballasted up and towed away, either for reuse or destruction, and any residual rock and concrete block armor remaining at the original site can be reconfigured into effective fishing reefs.

While the present invention has been described with reference to wave defense systems per se, it is understood that other, known structures may be used in conjunction with the wave defense systems to make them more effective in actual practice. For example, a wave defense system for protecting an artificial manmade island may, depending on site conditions, be made more effective by the placement of one or more underwater berms on the windward side of the wave defense system. In a similar manner, a wave defense system for protecting a coastline or shoreline against erosion and other wave damage may, depending on site conditions, be made more effective by the placement of one or more underwater berms on the leeward side of the wave defense system, i.e., between the wave defense system and the coastline or shoreline. Such underwater berms would most usually be constructed of properly sized riprap in a manner well known in the art.

The present invention has been described with reference to particular embodiments thereof, and obvious variations and modifications will be readily apparent to those of ordinary skill in the art. The present invention is intended to cover all such obvious variations and modifications which fall within the spirit and scope of the appended claims.

I claim:

1. A modular caisson installation demountably installed at a preselected water site, the modular caisson installation comprising: a plurality of caissons having tops and bottoms and being individually demountably installed in a predetermined configuration at a preselected water site with the caisson bottoms removably seated on a bed at the preselected water site, the caissons being constructed of one or more floatable sections each being fluid trimmable and fluid ballastable and having means for trimming and ballasting the section with fluid to effect controlled lowering and positioning thereof during formation of the installation and controlled raising and removal thereof by floatation to enable demounting of the installation.

2. A modular caisson installation according to claim 1; wherein the predetermined configuration of caissons includes a line of first caissons defining a wave defense system, and a plurality of second caissons disposed on an inward side of the wave defense system.

3. A modular caisson installation according to claim 2; wherein the second caissons comprise multi-purpose caissons having hollow interior portions.

4. A modular caisson installation according to claim 2; wherein the second caissons comprise storage caissons having hollow interior portions for the storage of bulk materials.

5. A modular caisson installation according to claim 2; wherein the first caissons comprise wave defense caissons having opposed outer and inner sides, the outer sides having sloped portions facing outwardly of the installation and the inner sides facing inwardly of the installation.

6. A modular caisson installation according to claim 5; wherein both the outer and inner sides of the wave defense caissons have sloped portions.

7. A modular caisson installation according to claim 6; wherein the outer sides of the wave defense caissons have upper sloped portions having a relatively gradual rise and lower sloped portions having a relatively steep rise.

8. A modular caisson installation according to claim 6; wherein the inner sides of the wave defense caissons have sloped upper portions and generally horizontal ledge portions both disposed above the water surface.

9. A modular caisson installation according to claim 1; wherein the predetermined configuration of caissons includes a line of first caissons defining a wave defense system, a line of second caissons disposed on an inward side of and juxtaposed with the line of first caissons, and third caissons interposed between the two lines at intervals therealong.

10. A modular caisson installation according to claim 9; wherein the third caissons comprise transverse support caissons having ports for permitting water to flow through the caissons in a direction laterally of the lines of wave defense caissons and second caissons.

11. A modular caisson installation according to claim 1; wherein the predetermined configuration of caissons includes a line of first caissons defining a protected area on an inward side thereof, and second caissons disposed in the protected area.

12. A modular caisson installation according to claim 11; wherein the second caissons comprise storage caissons having hollow interior portions for the storage of bulk materials.

13. A modular caisson installation according to claim 1; wherein the predetermined configuration of caissons includes a line of first caissons, and at least one anchor tower caisson in the line.

14. A modular caisson installation according to claim 13; wherein the line of first caissons includes anchor tower caissons interspersed at intervals along the line.

15. A modular caisson installation according to claim 14; wherein the anchor tower caissons are seated deeper in the bed than the first caissons to help anchor the line of caissons.

16. A modular caisson installation according to claim 15; wherein the tops of the anchor tower caissons extend to the same level above the water surface as that of the first caissons.

17. A modular caisson installation according to claim 16; wherein the first caissons comprise wave defense caissons having opposed outer and inner sides, the outer sides having sloped portions facing outwardly of the installation and the inner sides facing inwardly of the installation.

18. A modular caisson installation according to claim 1; wherein the predetermined configuration of caissons includes a wave defense system comprised of a line of caissons defining a protected area on an inward side thereof, and a group of caissons disposed in the protected area on the inward side of the wave defense system.

19. A modular caisson installation according to claim 18; wherein the predetermined configuration includes caissons including those in the group of caissons disposed in a closed ring configuration to define a polder on the inward side of the wave defense system.

20. A modular caisson installation according to claim 19; wherein the ring of caissons includes a lock to permit vessels to enter and leave the polder.

21. A modular caisson installation according to claim 18; wherein at least some of the group of caissons comprise storage caissons having hollow interior portions for the storage of bulk materials.

22. A modular caisson system demountably installed at a preselected water site, the modular caisson system comprising: a plurality of caissons having tops and bottoms and being installed one-by-one in a predetermined configuration at a preselected water site with the caisson bottoms removably seated on a bed at the preselected site; each caisson being constructed of one or more floatable sections each having a hollow interior portion and sufficient buoyancy to be rendered floatable in water to enable at least partial construction thereof onshore and towing thereof to the preselected site; and each floatable section being fluid trimmable and fluid ballastable independently of the other floatable sections and having means for trimming and ballasting the section with fluid to effect controlled lowering and positioning thereof during installation of the caisson system and controlled raising and removal thereof by floatation to enable demounting of the caisson system.

23. A modular caisson system according to claim 22; wherein at least some of the caissons comprise storage caissons having hollow interior portions for the storage of bulk materials.

24. A modular caisson system according to claim 22; wherein the predetermined configuration includes at least one line of caissons defining a wave defense system having a protected area on an inward side thereof, and caissons disposed in the protected area.

25. A modular caisson system according to claim 24; wherein the caissons disposed in the protected area include multi-purpose caissons.

26. A modular caisson system according to claim 24; wherein the caissons disposed in the protected area include storage caissons having hollow interior portions for the storage of bulk materials.

27. A modular caisson system according to claim 24; wherein the line of caissons includes at least one anchor tower caisson in the line, the anchor tower caisson being seated deeper in the bed than the other caissons in the line.

28. A modular caisson system according to claim 22; wherein the predetermined configuration of caissons comprises a line of caissons disposed in a closed ring configuration to define a polder on the inward side of the ring of caissons.

29. A modular caisson system according to claim 28; wherein the ring of caissons includes a lock to permit vessels to enter and leave the polder.

30. A modular caisson system according to claim 29; wherein the lock is provided in one of the caissons of the ring of caissons.

31. A modular caisson system according to claim 28; wherein the ring of caissons includes storage caissons.

32. A modular caisson system according to claim 28; wherein the ring of caissons includes multi-purpose caissons.

33. A modular caisson system according to claim 22; wherein the predetermined configuration of caissons comprises a line of caissons disposed in an open loop configuration.

34. A modular caisson installation according to claim 1; wherein the caissons each have a height, a width, and a length equal to or greater than the width, and wherein the height of each of the caissons is not more than two times greater than the width thereof.

35. A modular-caisson system according to claim 22; wherein each caisson has a height, a width, and a length equal to or greater than the width, and wherein the height is not more than two times greater than the width.

36. A modular caisson installation according to claim 11; wherein at least some of the caissons have a hollow interior portion of sufficient size to enable the storage therein of bulk materials; and wherein said caissons, even when empty of bulk materials, have a mass distribution effective to maintain stability thereof when said caissons are installed at the preselected water site.

37. A modular caisson system according to claim 22; wherein at least some of the caissons have a hollow interior portion for the storage of bulk materials; and wherein said caissons, even when empty of bulk materials, have a mass distribution effective to maintain stability thereof when said caissons are installed at the preselected water site.

38. A modular caisson installation according to claim 19; wherein one of the group of caissons has a lock to permit vessels to enter and leave the polder.

39. A modular caisson installation according to claim 38; wherein at least some of the group of caissons comprise storage caissons having hollow interior portions for the storage of bulk materials.

40. A modular caisson installation according to claim 20; wherein the lock is provided in one of the group of caissons disposed in the protected area.

41. A modular caisson installation according to claim 1; wherein the predetermined configuration of caissons includes a line of caissons defining a wave defense system forming a protected area on an inward side thereof; and a marine power plant disposed in the protected area.

42. A modular caisson installation according to claim 41; wherein the predetermined configuration of caissons further includes another line of caissons disposed in the protected area defining a docking area for a tanker.

43. A modular caisson system according to claim 1; wherein the predetermined configuration of caissons includes a line of first caissons defining a protected area on an inward side thereof, and a line of second caissons disposed on the inward side of and juxtaposed with the line of first caissons.

44. A modular caisson system according to claim 43; wherein the second caissons comprise multi-purpose caissons.

45. A modular caisson system according to claim 43; wherein the predetermined configuration of caissons includes a line of third caissons disposed on an outward side of and juxtaposed with the line of first caissons.

46. A modular caisson system according to claim 45; wherein the first caissons comprise inner wave defense caissons and the third caissons comprise outer wave defense caissons.

47. A modular caisson system according to claim 46; wherein the predetermined configuration of caissons includes transverse support caissons interposed between the lines of inner and outer wave defense caissons.

48. A modular caisson system according to claim 47; wherein the transverse support caissons have ports for permitting water to flow therethrough in a direction laterally of the lines of inner and outer wave defense caissons.

49. A modular caisson system according to claim 46; wherein the predetermined configuration of caissons includes one or more anchor tower caissons in the line of outer wave defense caissons.

50. A modular caisson system according to claim 49; wherein each anchor tower caisson extends deeper in the bed than the outer wave defense caissons to help anchor the line of outer wave defense caissons.

51. A modular caisson system according to claim 1; wherein the caissons have a shape which is preselected to enable the caissons to be scaled to size for use at different sites having different water depths and different maximum wind and wave conditions.

52. A modular caisson system according to claim 11; wherein the second caissons comprise multi-purpose caissons.

53. A modular caisson system according to claim 20; wherein the predetermined configuration of caissons includes a line of caissons defining a wave defense system forming a protected area on an inward side thereof; and a marine power plant disposed in the protected area.

54. A modular caisson system according to claim 43; wherein the predetermined configuration of caissons further includes another line of caissons disposed in the protected area defining a docking area for a tanker.

55. A modular caisson system according to claim 22; wherein at least some of the caissons comprise multi-purpose caissons.

56. A modular caisson system according to claim 22; wherein the caissons have a shape which is preselected to enable the caissons to be scaled to size for use at different sites having different water depths and different maximum wind and wave conditions.

57. A modular caisson system according to claim 22; wherein the predetermined configuration of caissons includes a line of first caissons defining a protected area on an inward side thereof, and a line of second caissons disposed on the inward side of and juxtaposed with the line of first caissons.

58. A modular caisson system according to claim 57; wherein the second caissons comprise multi-purpose caissons.

59. A modular caisson system according to claim 57; wherein the predetermined configuration of caissons includes a line of third caissons disposed on an outward side of and juxtaposed with the line of first caissons.

60. A modular caisson system according to claim 59; wherein the first caissons comprise inner wave defense caissons and the third caissons comprise outer wave defense caissons.

61. A modular caisson system according to claim 60; wherein the predetermined configuration of caissons includes transverse support caissons interposed between the lines of inner and outer wave defense caissons.

62. A modular caisson system according to claim 61; wherein the transverse support caissons have ports for permitting water to flow therethrough in a direction laterally of the lines of inner and outer wave defense caissons.

63. A modular caisson system according to claim 59; wherein the predetermined configuration of caissons includes one or more anchor tower caissons in the line of outer wave defense caissons, each anchor tower caisson extending deeper in the bed than the outer wave defense caissons to help anchor the line of outer wave defense caissons.

* * * * *